United States Patent
Cooper

(10) Patent No.: US 10,197,144 B2
(45) Date of Patent: Feb. 5, 2019

(54) DRIVE UNIT WITH TORQUE VECTORING AND AN AXLE DISCONNECT AND RECONNECT MECHANISM

(71) Applicant: Dana Heavy Vehicle Systems Group, LLC, Maumee, OH (US)

(72) Inventor: Kenneth E. Cooper, Toledo, OH (US)

(73) Assignee: Dana Heavy Vehicle Systems Group, LLC, Maumee, OH (US)

(*) Notice: Subject to any disclaimer, the term of this patent is extended or adjusted under 35 U.S.C. 154(b) by 42 days.

(21) Appl. No.: 15/411,555

(22) Filed: Jan. 20, 2017

(65) Prior Publication Data

US 2018/0209527 A1 Jul. 26, 2018

(51) Int. Cl.
*F16H 48/22* (2006.01)
*B60K 17/02* (2006.01)
(Continued)

(52) U.S. Cl.
CPC ............. *F16H 48/22* (2013.01); *B60K 17/02* (2013.01); *B60K 17/16* (2013.01); *B60K 17/165* (2013.01); *B60K 17/34* (2013.01); *B60K 17/3515* (2013.01); *B60K 23/04* (2013.01); *F16D 11/16* (2013.01); *F16D 13/52* (2013.01); *F16D 21/00* (2013.01); *F16H 48/36* (2013.01);
(Continued)

(58) Field of Classification Search
CPC .......... F16H 48/22; F16H 48/40; F16H 48/34; F16H 48/32; F16D 21/00; F16D 11/16; F16D 13/52; B60K 23/04
See application file for complete search history.

(56) References Cited

U.S. PATENT DOCUMENTS 2,913,929 A 11/1959 Anderson
3,063,529 A 11/1962 Cook
(Continued)

FOREIGN PATENT DOCUMENTS

DE 3801351 A1 8/1989
DE 102011010597 A1 2/2012
(Continued)

OTHER PUBLICATIONS

European Patent Office, European Search Report with written opinion issued in Application 18152557.7, dated Oct. 5, 2018, 8 pages, European Patent Office, Munich, Germany.

*Primary Examiner* — David J Hlavka
(74) *Attorney, Agent, or Firm* — Marshall & Melhorn, LLC

(57) ABSTRACT

A differential assembly having a torque coupling unit and an axle disconnect. A first end portion of an intermediate portion of a differential case is integrally connected to a ring gear. Integrally connected to an inner surface of the intermediate portion of the case is a first plurality of clutch plates. Disposed within a hollow portion of the intermediate portion is a first and a second differential side gear that are meshing with one or more pinion gears. Drivingly connected to the first side gear is a first output shaft. A clutch can having a second plurality of clutch plates is drivingly connected to the first output shaft. Within the hollow portion of the intermediate portion of the case is a clutching assembly that selectively engages the second side gear. A first clutch actuator selectively engages the plurality of plates and a second clutch actuator selectively engages the clutching assembly.

22 Claims, 10 Drawing Sheets

(51) Int. Cl.

| | | |
|---|---|---|
| *B60K 17/16* | (2006.01) | |
| *B60K 17/34* | (2006.01) | |
| *B60K 23/04* | (2006.01) | |
| *F16D 11/16* | (2006.01) | |
| *F16D 13/52* | (2006.01) | |
| *F16D 21/00* | (2006.01) | |
| *F16H 48/40* | (2012.01) | |
| *B60K 17/35* | (2006.01) | |
| *F16H 48/36* | (2012.01) | |
| *F16H 48/08* | (2006.01) | |
| *F16H 48/32* | (2012.01) | |
| *F16H 48/34* | (2012.01) | |

(52) U.S. Cl.
CPC ............ *F16H 48/40* (2013.01); *F16H 48/08* (2013.01); *F16H 48/32* (2013.01); *F16H 48/34* (2013.01)

(56) References Cited

U.S. PATENT DOCUMENTS

| | | |
|---|---|---|
| 3,161,270 A | 12/1964 | Aschauer |
| 3,592,304 A | 7/1971 | Thompson |
| 3,680,409 A | 8/1972 | Chamberlain |
| 4,157,750 A | 6/1979 | Horsch |
| 4,263,824 A | 4/1981 | Mueller |
| 4,271,722 A | 6/1981 | Campbell |
| 4,526,063 A | 7/1985 | Oster |
| RE31,981 E | 9/1985 | Lindbert |
| 4,625,584 A | 12/1986 | Onodera |
| 4,712,448 A | 12/1987 | Lanzer |
| 4,718,303 A | 1/1988 | Fogelberg |
| 4,782,720 A | 11/1988 | Teraoka et al. |
| 4,805,486 A | 2/1989 | Hagiwara et al. |
| 4,895,236 A | 1/1990 | Sakakibara et al. |
| 4,898,431 A | 2/1990 | Kamopp et al. |
| 4,907,685 A | 3/1990 | Landolt |
| 4,921,065 A | 5/1990 | Hamada et al. |
| 4,950,214 A | 8/1990 | Botterill |
| 4,955,853 A | 9/1990 | Bausch |
| 4,998,593 A | 3/1991 | Kamopp et al. |
| 5,019,021 A | 5/1991 | Janson |
| 5,033,329 A | 7/1991 | Tezuka |
| 5,080,640 A | 1/1992 | Botterill |
| 5,086,867 A | 2/1992 | Hirota et al. |
| 5,092,825 A | 3/1992 | Goscenski, Jr. et al. |
| 5,098,360 A | 3/1992 | Hirota |
| 5,105,901 A | 4/1992 | Watanabe et al. |
| 5,106,349 A | 4/1992 | Botterill et al. |
| 5,119,900 A | 6/1992 | Watanabe et al. |
| 5,135,071 A | 8/1992 | Shibahata et al. |
| 5,136,507 A | 8/1992 | Shiraishi et al. |
| 5,172,787 A | 12/1992 | Kobayashi |
| 5,261,503 A | 11/1993 | Yasui |
| 5,279,401 A | 1/1994 | Stall |
| 5,299,986 A | 4/1994 | Fabris et al. |
| 5,415,598 A | 5/1995 | Sawase et al. |
| 5,417,298 A | 5/1995 | Shibahata |
| 5,450,919 A | 9/1995 | Shitani |
| 5,456,641 A | 10/1995 | Sawase |
| 5,483,446 A | 1/1996 | Momose et al. |
| 5,531,653 A | 7/1996 | Barholt |
| 5,577,588 A | 11/1996 | Raszkowski |
| 5,671,982 A | 9/1997 | Wanke |
| 5,690,002 A | 11/1997 | Showalter |
| 5,699,888 A | 12/1997 | Showalter |
| 5,732,379 A | 3/1998 | Eckert et al. |
| 5,762,406 A | 6/1998 | Yasui et al. |
| 5,791,447 A | 8/1998 | Lamela et al. |
| 5,810,142 A | 9/1998 | Schaefer |
| 5,839,328 A | 11/1998 | Showalter |
| 5,845,546 A | 12/1998 | Knowles et al. |
| 5,850,616 A | 12/1998 | Matsuno et al. |
| 5,884,738 A | 3/1999 | Joslin et al. |
| 5,910,064 A | 6/1999 | Kuroki |
| 5,911,291 A | 6/1999 | Suetake et al. |
| 5,911,643 A | 6/1999 | Godlew et al. |
| 5,921,889 A | 7/1999 | Nozaki et al. |
| 5,941,334 A | 8/1999 | Inagaki |
| 5,964,126 A | 10/1999 | Okcuoglu |
| 5,966,999 A | 10/1999 | Showalter et al. |
| 6,063,000 A | 5/2000 | Sugimoto |
| 6,064,930 A | 5/2000 | Shibahata |
| 6,070,495 A | 6/2000 | Kuroda et al. |
| 6,079,535 A | 6/2000 | Mueller et al. |
| 6,094,614 A | 7/2000 | Hiwatashi |
| 6,095,276 A | 8/2000 | Kuroda et al. |
| 6,098,770 A | 8/2000 | Isley, Jr. |
| 6,105,703 A | 8/2000 | Kuroda et al. |
| 6,189,669 B1 | 2/2001 | Kremer et al. |
| 6,244,407 B1 | 6/2001 | Kremer et al. |
| 6,308,812 B1 | 10/2001 | Eike et al. |
| 6,327,935 B1 | 12/2001 | Joslin et al. |
| 6,349,809 B1 | 2/2002 | Isley, Jr. |
| 6,378,677 B1 | 4/2002 | Kuroda et al. |
| 6,393,351 B2 | 5/2002 | Frediani et al. |
| 6,398,686 B1 | 6/2002 | Irwin |
| 6,427,102 B1 | 7/2002 | Ding |
| 6,432,021 B1 | 8/2002 | Averill |
| 6,442,469 B1 | 8/2002 | Matsuno |
| 6,460,674 B1 | 10/2002 | Clay |
| 6,460,677 B1 | 10/2002 | Roscoe |
| 6,478,708 B2 | 11/2002 | Krisher |
| 6,493,624 B2 | 12/2002 | Nishida et al. |
| 6,497,301 B2 | 12/2002 | Iida et al. |
| 6,517,462 B2 | 2/2003 | Borgan et al. |
| 6,533,090 B2 | 3/2003 | Osborn et al. |
| 6,533,699 B1 | 3/2003 | Fett |
| 6,537,172 B1 | 3/2003 | McAuliffe, Jr. et al. |
| 6,561,939 B1 | 5/2003 | Knapke |
| 6,564,134 B2 | 5/2003 | Nishida et al. |
| 6,564,140 B2 | 5/2003 | Ichikawa et al. |
| 6,571,928 B1 | 6/2003 | Gassmann |
| 6,582,336 B2 | 6/2003 | Forrest et al. |
| 6,604,596 B2 | 8/2003 | Bracke et al. |
| 6,631,779 B2 | 10/2003 | Watson et al. |
| 6,654,674 B2 | 11/2003 | Lu et al. |
| 6,711,968 B2 | 3/2004 | Krzesicki et al. |
| 6,719,662 B2 | 4/2004 | Forrest et al. |
| 6,742,640 B1 | 6/2004 | Grogg et al. |
| 6,742,642 B1 | 6/2004 | Stevenson et al. |
| 6,755,763 B1 | 6/2004 | Goto et al. |
| 6,766,889 B1 | 7/2004 | Pennycuff |
| 6,779,420 B2 | 8/2004 | Peura |
| 6,790,154 B1 | 9/2004 | Kelley, Jr. |
| 6,805,653 B2 | 10/2004 | Krzesicki et al. |
| 6,808,037 B1 | 10/2004 | Mueller |
| 6,808,052 B2 | 10/2004 | Kirkwood et al. |
| 6,817,434 B1 | 11/2004 | Sweet |
| 6,830,122 B2 | 12/2004 | Kroppe |
| 6,840,363 B2 | 1/2005 | Braford, Jr. et al. |
| 6,885,931 B2 | 4/2005 | Anwar |
| 6,905,008 B2 | 6/2005 | Kowalsky et al. |
| 6,938,748 B2 | 9/2005 | Pennycuff |
| 6,945,374 B2 | 9/2005 | Puiu |
| 6,945,375 B2 | 9/2005 | Kirkwood et al. |
| 6,948,604 B2 | 9/2005 | Puiu |
| 6,959,799 B2 | 11/2005 | Fusegi et al. |
| 6,962,227 B1 | 11/2005 | Kirkwood |
| 6,963,797 B2 | 11/2005 | Salib et al. |
| 6,971,494 B2 | 12/2005 | Puiu |
| 6,991,079 B2 | 1/2006 | Puiu |
| 6,991,080 B2 | 1/2006 | Puiu |
| 6,997,299 B2 | 2/2006 | Brissenden et al. |
| 7,001,303 B1 | 2/2006 | Peura |
| 7,004,870 B2 | 2/2006 | Kroppe |
| 7,004,873 B2 | 2/2006 | Puiu |
| 7,007,763 B2 | 3/2006 | Ginther et al. |
| 7,021,445 B2 | 4/2006 | Brissenden et al. |
| 7,037,231 B2 | 5/2006 | Showalter |
| 7,044,880 B2 | 5/2006 | Bowen |
| 7,059,462 B2 | 6/2006 | Brissenden et al. |
| 7,059,992 B1 | 6/2006 | Bowen |

(56) References Cited

U.S. PATENT DOCUMENTS

| | | |
|---|---|---|
| 7,080,707 B2 | 7/2006 | Kirkwood |
| 7,083,172 B2 | 8/2006 | Kou |
| 7,083,541 B2 | 8/2006 | Pecnik et al. |
| 7,111,702 B2 | 9/2006 | Perlick et al. |
| 7,111,716 B2 | 9/2006 | Ekonen et al. |
| 7,125,357 B2 | 10/2006 | Porter |
| 7,132,937 B2 | 11/2006 | Lu et al. |
| 7,175,557 B2 | 2/2007 | Kirkwood et al. |
| 7,201,264 B2 | 4/2007 | Puiu |
| 7,201,266 B2 | 4/2007 | Brissenden et al. |
| 7,239,949 B2 | 7/2007 | Lu et al. |
| 7,258,213 B2 | 8/2007 | Ekonen et al. |
| 7,267,628 B2 | 9/2007 | Bowen |
| 7,278,943 B2 | 10/2007 | Puiu |
| 7,294,086 B2 | 11/2007 | Brissenden et al. |
| 7,300,385 B2 | 11/2007 | Cherry et al. |
| 7,316,304 B2 | 1/2008 | Heravi et al. |
| 7,337,886 B2 | 3/2008 | Puiu |
| 7,338,403 B2 | 3/2008 | Puiu |
| 7,344,469 B2 | 3/2008 | Sharma et al. |
| 7,357,748 B2 | 4/2008 | Kelley, Jr. |
| 7,390,278 B2 | 6/2008 | Krisher |
| 7,445,581 B2 | 11/2008 | Cring |
| 7,452,299 B2 | 11/2008 | Teraoka |
| 7,455,135 B2 | 11/2008 | Janson et al. |
| 7,458,437 B2 | 12/2008 | Davidsson |
| 7,491,146 B2 | 2/2009 | Sharma et al. |
| 7,497,311 B2 | 3/2009 | Knowles |
| 7,503,416 B2 | 3/2009 | Sharma et al. |
| 7,506,740 B2 | 3/2009 | Ronk et al. |
| 7,510,041 B2 | 3/2009 | Bowen |
| 7,527,133 B2 | 5/2009 | Sachsenmaier et al. |
| 7,530,421 B2 | 5/2009 | Mori et al. |
| 7,533,754 B2 | 5/2009 | Burrows et al. |
| 7,584,832 B2 | 9/2009 | Baasch et al. |
| 7,610,980 B2 | 11/2009 | Mori |
| 7,686,149 B2 | 3/2010 | Sachsenmaier et al. |
| 7,694,794 B2 | 4/2010 | Biles et al. |
| 7,699,740 B2 | 4/2010 | Gassmann et al. |
| 7,811,194 B2 | 10/2010 | Bowen |
| 7,846,056 B2 | 12/2010 | Chludek et al. |
| 7,887,450 B2 | 2/2011 | Fusegi et al. |
| 8,025,137 B2 | 9/2011 | Sasaki et al. |
| 8,042,642 B2 | 10/2011 | Marsh et al. |
| 8,047,323 B2 | 11/2011 | Downs et al. |
| 8,215,440 B2 | 7/2012 | Hoffmann et al. |
| 8,231,493 B2 | 7/2012 | Radzevich |
| 8,308,598 B2 | 11/2012 | Pritchard et al. |
| 8,313,407 B2 | 11/2012 | Ekonen et al. |
| 8,348,799 B2 | 1/2013 | Maruyama et al. |
| 8,388,486 B2 | 3/2013 | Ekonen et al. |
| 8,474,349 B2 | 7/2013 | Grogg et al. |
| 8,506,441 B2 | 8/2013 | Hultgren |
| 8,534,409 B2 | 9/2013 | Sigmund et al. |
| 8,584,785 B2 | 11/2013 | Marsh et al. |
| 8,584,786 B2 | 11/2013 | Grogg |
| 8,584,823 B2 | 11/2013 | Phillips et al. |
| 8,597,150 B1 | 12/2013 | Downs et al. |
| 8,720,633 B2 | 5/2014 | Grutter et al. |
| 8,905,212 B2 | 12/2014 | Vierk et al. |
| 2002/0077212 A1 | 6/2002 | Krisher |
| 2003/0171182 A1 | 9/2003 | Peura |
| 2005/0261101 A1 | 11/2005 | Yoshioka |
| 2006/0011441 A1 | 1/2006 | Showalter |
| 2006/0014601 A1 | 1/2006 | Kelley, Jr. |
| 2006/0032722 A1 | 2/2006 | Guinter et al. |
| 2006/0163018 A1 | 7/2006 | Ekonen et al. |
| 2006/0293141 A1* | 12/2006 | Sharma ............... B60K 23/04 475/204 |
| 2007/0095628 A1 | 5/2007 | Niederbacher |
| 2007/0282512 A1 | 12/2007 | Hoeck et al. |
| 2008/0210508 A1 | 9/2008 | Heisey et al. |
| 2008/0254931 A1* | 10/2008 | Sugaya ............... F16H 48/08 475/238 |
| 2009/0093333 A1* | 4/2009 | Adams, III ......... F16H 48/08 475/88 |
| 2010/0038164 A1 | 2/2010 | Downs et al. |
| 2010/0094519 A1 | 4/2010 | Quehenberger et al. |
| 2011/0039652 A1 | 2/2011 | Ekonen et al. |
| 2011/0143878 A1 | 6/2011 | Juenemann et al. |
| 2011/0179906 A1 | 7/2011 | Juenemann et al. |
| 2011/0308875 A1 | 12/2011 | Marsh et al. |
| 2011/0319213 A1 | 12/2011 | Ekonen et al. |
| 2012/0021864 A1 | 1/2012 | Ziech et al. |
| 2012/0238388 A1 | 9/2012 | Fusegi et al. |
| 2012/0252625 A1 | 10/2012 | Crasset |
| 2013/0178321 A1 | 7/2013 | Ekonen et al. |
| 2013/0178323 A1 | 7/2013 | Ekonen et al. |
| 2013/0190126 A1 | 7/2013 | Bradford, Jr. |
| 2013/0260959 A1 | 10/2013 | Quehenberger et al. |
| 2014/0124320 A1 | 5/2014 | Cooper |
| 2014/0305116 A1* | 10/2014 | Hiyoshi ............... F16H 48/145 60/393 |
| 2014/0309007 A1 | 10/2014 | Schimpf et al. |

FOREIGN PATENT DOCUMENTS

| | | |
|---|---|---|
| DE | 102012216709 A1 | 3/2014 |
| DE | 102012216710 A1 | 3/2014 |
| EP | 0193383 A1 | 9/1986 |
| GB | 2216077 A | 10/1989 |
| JP | S58209624 A | 12/1983 |
| JP | H034055 A | 1/1991 |
| JP | H03070633 A | 3/1991 |
| JP | H04143129 A | 5/1992 |
| JP | H05185859 A | 7/1993 |
| JP | H06099758 A | 4/1994 |
| JP | H06270708 A | 9/1994 |
| JP | 2800945 B2 | 9/1998 |
| JP | 2002370557 A | 12/2002 |
| JP | 2004068878 A | 3/2004 |
| JP | 2010260383 A | 11/2010 |
| WO | 8602981 A1 | 5/1986 |
| WO | 2007002736 A2 | 1/2007 |

* cited by examiner

US 10,197,144 B2

DRIVE UNIT WITH TORQUE VECTORING AND AN AXLE DISCONNECT AND RECONNECT MECHANISM

FIELD OF THE DISCLOSURE

The present disclosure relates to a drive unit for a vehicle having a torque coupling unit and an axle disconnect and reconnect mechanism.

BACKGROUND OF THE DISCLOSURE

When a vehicle accelerates the tractive effort of the vehicle increases. Many vehicles incorporate the use of a primary full-time driveline and one or more secondary drivelines that provide additional traction when the vehicle is accelerating or when the vehicle is in poor traction conditions. When the vehicle experiences poor traction conditions, a torque vectoring mechanism may be used to selectively limit the amount of torque flowing from the primary driveline to the one or more secondary drivelines of the vehicle.

As the vehicle gains speed and the acceleration of the vehicle declines, the overall tractive effort of the vehicle decreases. As the tractive effort of the vehicle decreases and the one or more secondary drivelines continue to rotate, energy from the system is lost due to oil churning and spinning losses in the one or more secondary drive lines. In order to improve the overall fuel economy of the vehicle, it is desirable to selectively connect and disconnect the one or more secondary drivelines to eliminate those parasitic losses.

Conventional differential assemblies having torque vectoring and axle connect and disconnect mechanisms need to be engineered and sized to handle relatively large torque loads. It would therefore be advantageous to develop a differential assembly with torque vectoring and axle connect and disconnect mechanisms where the torque vectoring mechanism only needs to be designed to handle synchronizing torque loads and the axle connect and disconnect mechanism only needs to designed to handle wheel torque loads.

SUMMARY OF THE DISCLOSURE

A differential assembly having a torque coupling unit and an axle disconnect mechanism. The differential assembly includes a pinion shaft with a pinion gear that is meshingly engaged with a differential ring gear. A differential case having a first end portion, a large diameter intermediate portion and a second end portion. At least a portion of a first end portion of the large diameter intermediate portion of the differential case is integrally connected to the differential ring gear. Integrally connected to the inner surface of the first end portion of the large diameter intermediate portion of the differential case is a first plurality of clutch plates.

Disposed within a hollow portion of the large diameter intermediate portion of the differential case is a first and a second differential side gear that are meshing with one or more pinion gears. Drivingly connected to the first differential side gear is a first differential output shaft. A clutch can having a second plurality of clutch plates is drivingly connected to the second end portion of the first differential output shaft. The first and the second plurality of clutch plates form a clutch pack of the torque coupling unit. Additionally, within the hollow portion of the large diameter intermediate portion of the differential case is a clutching assembly that is selectively engageable with the second differential side gear.

The first end portion of the differential case has a first reduced diameter portion and a second reduced diameter portion that is adjacent to and axially outboard from the first reduced diameter portion. Connecting the first reduced diameter portion of the first end portion of the differential case to a first end of the large diameter intermediate portion of the differential case is a first radially extending wall. The first radially extending wall has one or more openings that extend from an inner surface to an outer surface of the first radially extending wall. At least partially disposed within the one or more openings in the first radially extending wall is one or more thrust pins.

Radially outboard from the first reduced diameter portion of the first end portion of the differential case is a first clutch actuation mechanism. The first clutch actuation mechanism selectively engages the first and the second plurality of clutch plates by applying a force to an end of the one or more thrust pins causing the first and the second plurality of clutch plates to be at least variably frictionally engaged with the clutch can.

The second end portion of the differential case has a first reduced diameter portion and a second reduced diameter portion that is adjacent to and axially outboard from the first reduced diameter portion. Connecting the first reduced diameter portion of the second end portion of the differential case to a second end of the large diameter intermediate portion of the differential case is a second radially extending wall. The second radially extending wall has one or more openings that extend from an inner surface to an outer surface of the second radially extending wall. At least partially disposed within the one or more openings in the second radially extending wall is one or more thrust pins.

Radially outboard from the first reduced diameter portion of the second end portion of the differential case is a second clutch actuation mechanism. The second clutch actuation mechanism selectively engages the clutching assembly by applying a force to an end of the one or more thrust pins to selectively engage the clutching assembly with the second differential side gear.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

It is within the scope of this disclosure, and as a non-limiting example, that the axle disconnect and reconnect systems disclosed herein may be used in automotive, off-road vehicle, all-terrain vehicle, construction, structural, marine, aerospace, locomotive, military, machinery, robotic and/or consumer product applications. Additionally, as a non-limiting example, the axle disconnect and reconnect systems disclosed herein may also be used in passenger vehicle, electric vehicle, hybrid vehicle, commercial vehicle, autonomous vehicles, semi-autonomous vehicles and/or heavy vehicle applications.

Figure 1:
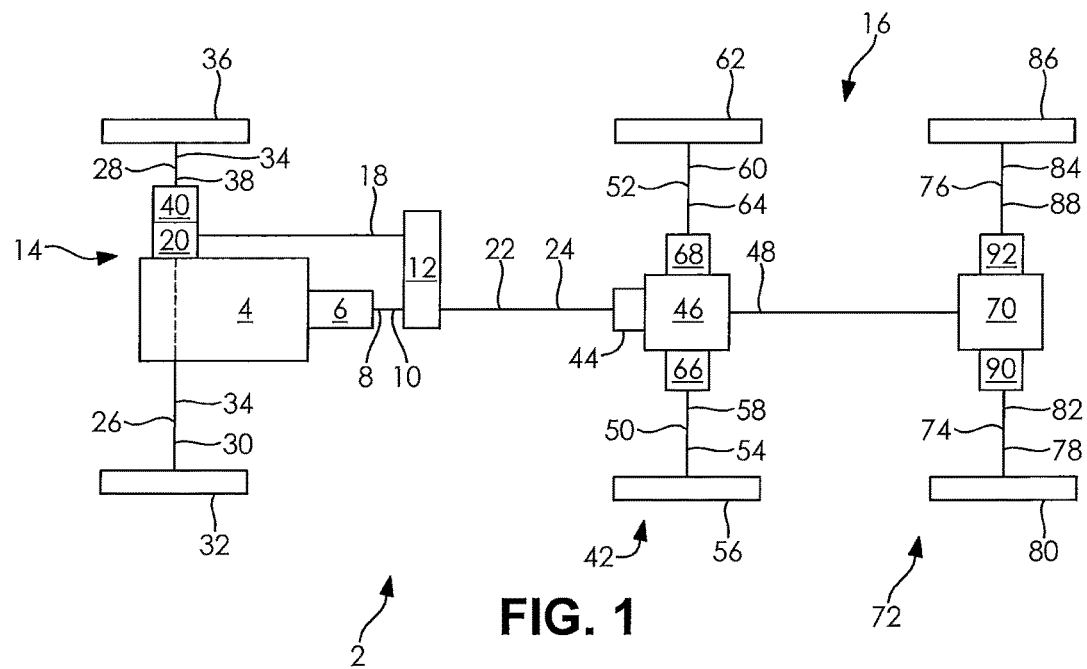
FIG. 1 is a schematic top-plan view of a vehicle having one or more differential assemblies and/or one or more axle disconnect systems according to an embodiment of the disclosure.

FIG. 1 is a schematic top-plan view of a vehicle 2 having one or more differential assemblies and/or one or more axle disconnect systems according to an embodiment of the disclosure. The vehicle 2 has an engine 4 which is drivingly connected to a transmission 6. A transmission output shaft 8 is then drivingly connected to an end of the transmission 6 opposite the engine 4. The transmission 6 is a power management system which provides controlled application of the rotational power generated by the engine 4 by means of a gear box.

The transmission output shaft 8 is drivingly connected to a transfer case input shaft 10 which in turn is drivingly connected to a transfer case 12. The transfer case 12 is used to transfer the rotational power from the transmission 6 to a front axle system 14 and/or a tandem axle system 16.

A first transfer case output shaft 18 is drivingly connected to a front axle differential 20 of the front axle system 14 and a second transfer case output shaft 22 is drivingly connected to an end of a first propeller shaft 24. The front axle differential 20 is a set of gears that allows the outer drive wheel(s) of a wheeled vehicle 2 to rotate at a faster rate than the inner drive wheel(s). The rotational power is transmitted through the front axle system 14 as described in more detail below.

The front axle system 14 further includes a first front axle half shaft 26 and a second front axle half shaft 28. The first front tandem axle half shaft 26 extends substantially perpendicular to the first transfer case output shaft 18. A first end 30 of the first front axle half shaft 26 is drivingly connected to a first front axle wheel assembly 32 and a second end 34 of the first front axle half shaft 26 is drivingly connected to an end of the front axle differential 20. As a non-limiting example, the second end 34 of the first front axle half shaft 26 is drivingly connected to a front axle differential side gear, a separate stub shaft, a separate coupling shaft, a first front axle half shaft axle disconnect system, a first front axle differential output shaft and/or a shaft that is formed as part of a front axle differential side gear.

Extending substantially perpendicular to the first transfer case output shaft 18 is the second front axle half shaft 28. A first end 34 of the second front axle half shaft 28 is drivingly connected to a second front axle wheel assembly 36 and a second end 38 of the second front axle half shaft 28 is drivingly connected to an end of the front axle differential 20 opposite the first front axle half shaft 26. As a non-limiting example, the second end 34 of the first front axle half shaft 26 is drivingly connected to a front axle differential side gear, a separate stub shaft, a separate coupling shaft, a second front axle half shaft axle disconnect system, a second front axle differential output shaft and/or a shaft that is formed as part of a front axle differential side gear.

In accordance with an embodiment of the disclosure, the front axle system 14 of the vehicle 2 may further include a first front axle half shaft disconnect system (not shown) and/or a second front axle half shaft disconnect system 40. The first front axle half shaft disconnect system (not shown) and the second front axle half shaft disconnect system 40 is used to selectively connect and disconnect the first front axle half shaft 26 from the front axle differential 20 and/or to selectively connect and disconnect the second front axle half shaft 28 from the front axle differential 20. When the first and/or the second front axle half shafts 26 and 28 are disconnected from the drive-line of the vehicle 2, the amount of spinning loss and friction loss decreases thereby increasing the overall efficiency of the drive-line and fuel efficiency of the vehicle 2. As a non-limiting example, first front axle half shaft disconnect system (not shown) and the second front axle half shaft disconnect system 40 may be a radial dog clutch or an axial dog clutch assembly.

As illustrated in FIG. 1 of the disclosure, one end of the second front axle half shaft disconnect system 40 is drivingly connected to the second end 38 of the second front axle half shaft 28. An end of the second front axle half shaft disconnect system 40 opposite the second front axle half shaft 28 is drivingly connected to a portion of the front axle differential 20 opposite the first front axle half shaft 26. As a non-limiting example, the end of the second front axle half shaft disconnect system 40 opposite the second front axle half shaft 28 is drivingly connected to a front axle differential side gear, a separate stub shaft, a separate coupling shaft, a second front axle differential output shaft and/or a shaft that is formed as part of a front axle differential side gear.

According to an embodiment of the disclosure (not shown) where the vehicle includes the use of the first front axle half shaft disconnect system, an end of the first front axle half shaft disconnect system is drivingly connected to the second end of the first front axle half shaft. An end of the first front axle half shaft disconnect system opposite the first front axle half shaft is drivingly connected to a portion of the front axle differential opposite the second front axle half shaft disconnect system. As a non-limiting example, the end of the first front axle half shaft disconnect system opposite the first front axle half shaft is drivingly connected to a front axle differential side gear, a separate stub shaft, a separate coupling shaft, a first front axle differential output shaft and/or a shaft that is formed as part of a front axle differential side gear.

The first propeller shaft 24 extends from the second transfer case output shaft 22 and drivingly connects the transfer case 12 to a forward tandem axle system 42 having an inter-axle differential 44. The first propeller shaft 24 may be connected to the inter-axle differential 44 through one or more of the following components (not shown) a drive shaft, a stub shaft, a coupling shaft, a forward tandem axle system input shaft, a pinion gear shaft, an inter-axle differential pinion gear shaft and/or an inter-axle differential input shaft. The inter-axle differential 44 is a device that divides the rotational power generated by the engine 4 between the axles in a vehicle 2. The rotational power is transmitted through the forward tandem axle system 42 as described in more detail below.

As illustrated in FIG. 1 the inter-axle differential 44 is drivingly connected to a forward tandem axle differential 46 and a forward tandem axle system output shaft 48. The forward tandem axle differential 46 is a set of gears that allows the outer drive wheel(s) of a wheeled vehicle 2 to rotate at a faster rate than the inner drive wheel(s).

The forward tandem axle system 42 further includes a first forward tandem axle half shaft 50 and a second forward tandem axle half shaft 52. The first forward tandem axle half shaft 50 extends substantially perpendicular to the first propeller shaft 24. A first end 52 of the first forward tandem axle half shaft 50 is drivingly connected to a first forward tandem axle wheel assembly 56 and a second end 58 of the first forward tandem axle half shaft 26 is drivingly connected to an end of the forward tandem axle differential 46. As a non-limiting example, the second end 58 of the first forward tandem axle half shaft 50 is drivingly connected to a forward tandem axle differential side gear, a separate stub shaft, a separate coupling shaft, a first forward tandem axle half shaft axle disconnect system, a first forward tandem axle differential output shaft and/or a shaft that is formed as part of a forward tandem axle differential side gear.

Extending substantially perpendicular to the first propeller shaft 24 is the second forward tandem axle half shaft 52. A first end 60 of the second forward tandem axle half shaft 52 is drivingly connected to a second forward tandem axle wheel assembly 62 and a second end 64 of the second forward tandem axle half shaft 52 is drivingly connected to an end of the forward tandem axle differential 46 opposite the first forward tandem axle half shaft 50. As a non-limiting example, the second end 64 of the second forward tandem axle half shaft 52 is drivingly connected to a forward tandem axle differential side gear, a separate stub shaft, a separate coupling shaft, a second forward tandem axle half shaft axle disconnect system, a second forward tandem axle differential output shaft and/or a shaft that is formed as part of a forward tandem axle differential side gear.

In accordance with an embodiment of the disclosure, the forward tandem axle system 42 of the vehicle 2 may further include a first forward tandem axle half shaft disconnect system 66 and/or a second forward tandem axle half shaft disconnect system 68. The first forward tandem axle half shaft disconnect system 66 and the second forward tandem axle half shaft disconnect system 68 is used to selectively connect and disconnect the first forward tandem axle half shaft 50 from the forward tandem axle differential 46 and/or to selectively connect and disconnect the second forward tandem axle half shaft 52 from the forward tandem axle differential 46. When the first and/or the second forward tandem axle half shafts 50 and 52 are disconnected from the drive-line of the vehicle 2, the amount of spinning loss and friction loss decreases thereby increasing the overall efficiency of the drive-line and fuel efficiency of the vehicle 2. As a non-limiting example, first forward tandem axle half shaft disconnect system 66 and the second forward tandem axle half shaft disconnect system 68 may be a radial dog clutch or an axial dog clutch assembly.

As illustrated in FIG. 1 of the disclosure, one end of the second forward tandem axle half shaft disconnect system 68 is drivingly connected to the second end 64 of the second forward tandem axle half shaft 52. An end of the second forward tandem axle half shaft disconnect system 68 opposite the second forward tandem axle half shaft 52 is drivingly connected to a portion of the forward tandem axle differential 46 opposite the first forward tandem axle half shaft 50. As a non-limiting example, the end of the second forward tandem axle half shaft disconnect system 68 opposite the second forward tandem axle half shaft 52 is drivingly connected to a forward tandem axle differential side gear, a separate stub shaft, a separate coupling shaft, a second forward tandem axle differential output shaft and/or a shaft that is formed as part of a forward tandem axle differential side gear.

According to an embodiment of the disclosure where the vehicle 2 includes the use of the first forward tandem axle half shaft disconnect system 66, an end of the first forward tandem axle half shaft disconnect system 66 is drivingly connected to the second end 64 of the first forward tandem axle half shaft 50. An end of the first forward tandem axle half shaft disconnect system 66 opposite the first forward tandem axle half shaft 50 is drivingly connected to a portion of the forward tandem axle differential 46 opposite the second forward tandem axle half shaft disconnect system 68. As a non-limiting example, the end of the first forward tandem axle half shaft disconnect system 66 opposite the first forward tandem axle half shaft 50 is drivingly connected to a forward tandem axle differential side gear, a separate stub shaft, a separate coupling shaft, a first forward tandem axle differential output shaft and/or a shaft that is formed as part of a forward tandem axle differential side gear.

One end of the forward tandem axle system output shaft 48 is drivingly connected to a side of the inter-axle differential 44 opposite the first propeller shaft 24. The forward tandem axle system output shaft 48 extends from the forward tandem axle system 42 to a rear tandem axle differential 70 of a rear tandem axle system 72. As illustrated in FIG. 1, the end of the forward tandem axle system output shaft 48 opposite the forward tandem axle system 42 is drivingly connected to the rear tandem axle differential 70. The forward tandem axle system output shaft 48 may be connected to the rear tandem axle differential 70 though one or more of the following components (not shown) a drive shaft, a propeller shaft, a stub shaft, a coupling shaft, a rear tandem axle system input shaft, a pinion gear shaft and/or a rear tandem axle differential input shaft. The rear tandem axle differential 70 is a set of gears that allows the outer drive wheel(s) of a wheeled vehicle 2 to rotate at a faster rate than the inner drive wheel(s). The rotational power is transmitted through the rear tandem axle system 72 as described in more detail below.

The rear tandem axle system 72 further includes a first rear tandem axle half shaft 74 and a second rear tandem axle half shaft 76. The first rear tandem axle half shaft 74 extends substantially perpendicular to the forward tandem axle system output shaft 48. A first end 78 of the first rear tandem axle half shaft 74 is drivingly connected to a first rear tandem axle wheel assembly 80 and a second end 82 of the first rear tandem axle half shaft 74 is drivingly connected to an end of the rear tandem axle differential 70. As a non-limiting example, the second end 82 of the first rear tandem axle half shaft 74 is drivingly connected to a rear tandem axle differential side gear, a separate stub shaft, a separate coupling shaft, a first rear tandem axle half shaft axle disconnect system, a first rear tandem axle differential output shaft and/or a shaft that is formed as part of a rear tandem axle differential side gear.

Extending substantially perpendicular to the forward tandem axle system output shaft 48 is the second rear tandem axle half shaft 76. A first end 84 of the second rear tandem axle half shaft 76 is drivingly connected to a second rear tandem axle wheel assembly 86 and a second end 88 of the second rear tandem axle half shaft 76 is drivingly connected to an end of the rear tandem axle differential 70 opposite the first rear tandem axle half shaft 74. As a non-limiting example, the second end 88 of the second rear tandem axle half shaft 76 is drivingly connected to a rear tandem axle differential side gear, a separate stub shaft, a separate coupling shaft, a second rear tandem axle half shaft axle disconnect system, a second rear tandem axle differential output shaft and/or a shaft that is formed as part of a rear tandem axle differential side gear.

In accordance with an embodiment of the disclosure, the rear tandem axle system 72 of the vehicle 2 may further include a first rear tandem axle half shaft disconnect system 90 and/or a second rear tandem axle half shaft disconnect system 92. The first rear tandem axle half shaft disconnect system 90 and the second rear tandem axle half shaft disconnect system 92 is used to selectively connect and disconnect the first rear tandem axle half shaft 74 from the rear tandem axle differential 70 and/or to selectively connect and disconnect the second rear tandem axle half shaft 76 from the rear tandem axle differential 70. When the first and/or the second rear tandem axle half shafts 74 and 76 are disconnected from the drive-line of the vehicle 2, the amount of spinning loss and friction loss decreases thereby increasing the overall efficiency of the drive-line and fuel efficiency of the vehicle 2. As a non-limiting example, first rear tandem axle half shaft disconnect system 90 and the second rear tandem axle half shaft disconnect system 92 may be a radial dog clutch or an axial dog clutch assembly.

As illustrated in FIG. 1 of the disclosure, one end of the second rear tandem axle half shaft disconnect system 92 is drivingly connected to the second end 88 of the second rear tandem axle half shaft 76. An end of the second rear tandem axle half shaft disconnect system 92 opposite the second rear tandem axle half shaft 76 is drivingly connected to a portion of the rear tandem axle differential 70 opposite the first rear tandem axle half shaft 74. As a non-limiting example, the end of the second rear tandem axle half shaft disconnect system 92 opposite the second rear tandem axle half shaft 76 is drivingly connected to a rear tandem axle differential side gear, a separate stub shaft, a separate coupling shaft, a second rear tandem axle differential output shaft and/or a shaft that is formed as part of a rear tandem axle differential side gear.

According to an embodiment of the disclosure where the vehicle 2 includes the use of the first rear tandem axle half shaft disconnect system 90, an end of the first rear tandem axle half shaft disconnect system 90 is drivingly connected to the second end 82 of the first rear tandem axle half shaft 74. An end of the first rear tandem axle half shaft disconnect system 90 opposite the first rear tandem axle half shaft 74 is drivingly connected to a portion of the rear tandem axle differential 70 opposite the second rear tandem axle half shaft disconnect system 92. As a non-limiting example, the end of the first rear tandem axle half shaft disconnect system 90 opposite the first rear tandem axle half shaft 74 is drivingly connected to a rear tandem axle differential side gear, a separate stub shaft, a separate coupling shaft, a first rear tandem axle differential output shaft and/or a shaft that is formed as part of a rear tandem axle differential side gear.

It is within the scope of this disclosure that one or more of the differential assemblies 20, 44, 46 and 70 of the vehicle 2 may be a differential assembly according to an embodiment of the disclosure.

Figure 2:
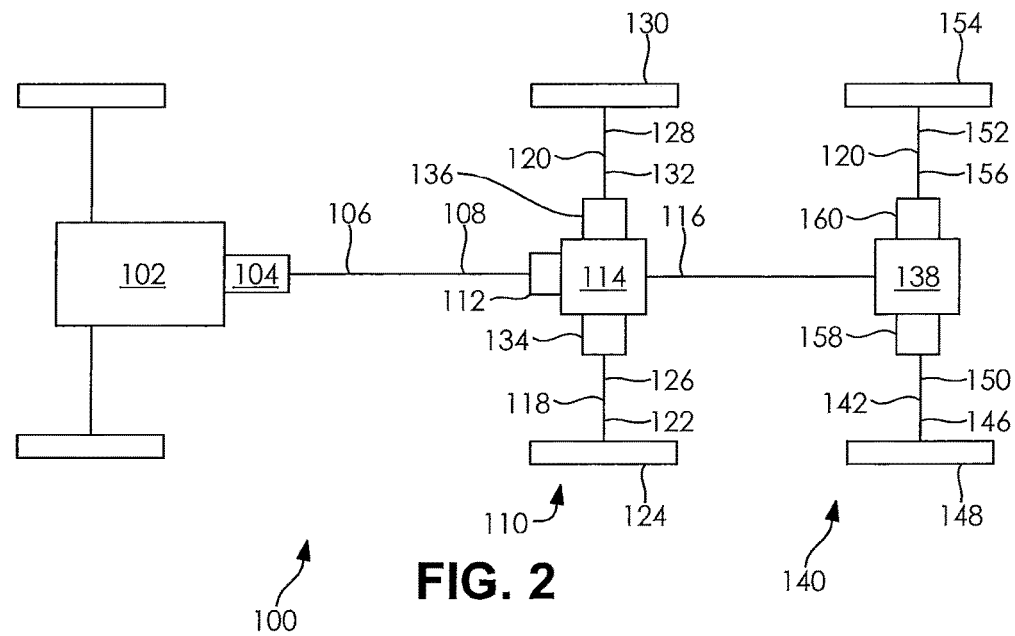
FIG. 2 is a schematic top-plan view of a vehicle having one or more differential assemblies and/or one or more axle disconnect systems according to an embodiment of the disclosure.

FIG. 2 is a schematic top-plan view of a vehicle 100 having one or more differential assemblies and/or one or more axle disconnect systems according to an embodiment of the disclosure. The vehicle 100 has an engine 102 which is drivingly connected to a transmission 104. A transmission output shaft 106 is then drivingly connected to an end of the transmission 104 opposite the engine 102. The transmission 104 is a power management system which provides controlled application of the rotational power generated by the engine 102 by means of a gear box.

An end of the transmission output shaft 106 opposite the transmission 104 is drivingly connected to an end of a propeller shaft 108. The propeller shaft 108 extends from the transmission output shaft 106 to a forward tandem axle system 110 having an inter-axle differentia 112. The propeller shaft 108 may be connected to the inter-axle differential 112 through one or more of the following components (not shown) a drive shaft, a stub shaft, a coupling shaft, a forward tandem axle system input shaft, a pinion gear shaft, an inter-axle differential pinion gear shaft and/or an inter-axle differential input shaft. The inter-axle differential 112 is a device that divides the rotational power generated by the engine 102 between the axles in a vehicle 100. The rotational power is transmitted through the forward tandem axle system 110 as described in more detail below.

As illustrated in FIG. 2 the inter-axle differential 112 is drivingly connected to a forward tandem axle differential 114 and a forward tandem axle system output shaft 116. The forward tandem axle differential 114 is a set of gears that allows the outer drive wheel(s) of a wheeled vehicle 100 to rotate at a faster rate than the inner drive wheel(s).

The forward tandem axle system 110 further includes a first forward tandem axle half shaft 118 and a second forward tandem axle half shaft 120. The first forward tandem axle half shaft 118 extends substantially perpendicular to the propeller shaft 108. A first end 122 of the first forward tandem axle half shaft 118 is drivingly connected to a first forward tandem axle wheel assembly 124 and a second end 126 of the first forward tandem axle half shaft 118 is drivingly connected to an end of the forward tandem axle differential 114. As a non-limiting example, the second end 126 of the first forward tandem axle half shaft 118 is drivingly connected to a forward tandem axle differential side gear, a separate stub shaft, a separate coupling shaft, a first forward tandem axle half shaft axle disconnect system, a first forward tandem axle differential output shaft and/or a shaft that is formed as part of a forward tandem axle differential side gear.

Extending substantially perpendicular to the propeller shaft 108 is the second forward tandem axle half shaft 120. A first end 128 of the second forward tandem axle half shaft 120 is drivingly connected to a second forward tandem axle wheel assembly 130 and a second end 132 of the second forward tandem axle half shaft 120 is drivingly connected to an end of the forward tandem axle differential 114 opposite the first forward tandem axle half shaft 118. As a non-limiting example, the second end 132 of the second forward tandem axle half shaft 120 is drivingly connected to a forward tandem axle differential side gear, a separate stub shaft, a separate coupling shaft, a second forward tandem axle half shaft axle disconnect system, a second forward tandem axle differential output shaft and/or a shaft that is formed as part of a forward tandem axle differential side gear.

In accordance with an embodiment of the disclosure, the forward tandem axle system 110 of the vehicle 100 may further include a first forward tandem axle half shaft disconnect system 134 and/or a second forward tandem axle half shaft disconnect system 136. The first forward tandem axle half shaft disconnect system 134 and the second forward tandem axle half shaft disconnect system 136 is used to selectively connect and disconnect the first forward tandem axle half shaft 118 from the forward tandem axle differential 114 and/or to selectively connect and disconnect the second forward tandem axle half shaft 120 from the forward tandem axle differential 114. When the first and/or the second forward tandem axle half shafts 118 and 120 are disconnected from the drive-line of the vehicle 100, the amount of spinning loss and friction loss decreases thereby increasing the overall efficiency of the drive-line and fuel efficiency of the vehicle 100. As a non-limiting example, first forward tandem axle half shaft disconnect system 134 and the second forward tandem axle half shaft disconnect system 136 may be a radial dog clutch or an axial dog clutch assembly.

As illustrated in FIG. 2 of the disclosure, one end of the second forward tandem axle half shaft disconnect system 136 is drivingly connected to the second end 132 of the second forward tandem axle half shaft 120. An end of the second forward tandem axle half shaft disconnect system 136 opposite the second forward tandem axle half shaft 120 is drivingly connected to a portion of the forward tandem axle differential 114 opposite the first forward tandem axle half shaft 118. As a non-limiting example, the end of the second forward tandem axle half shaft disconnect system 136 opposite the second forward tandem axle half shaft 120 is drivingly connected to a forward tandem axle differential side gear, a separate stub shaft, a separate coupling shaft, a second forward tandem axle differential output shaft and/or a shaft that is formed as part of a forward tandem axle differential side gear.

According to an embodiment of the disclosure where the vehicle 100 includes the use of the first forward tandem axle half shaft disconnect system 134, an end of the first forward tandem axle half shaft disconnect system 134 is drivingly connected to the second end 126 of the first forward tandem axle half shaft 118. An end of the first forward tandem axle half shaft disconnect system 134 opposite the first forward tandem axle half shaft 118 is drivingly connected to a portion of the forward tandem axle differential 114 opposite the second forward tandem axle half shaft disconnect system 136. As a non-limiting example, the end of the first forward tandem axle half shaft disconnect system 134 opposite the first forward tandem axle half shaft 118 is drivingly connected to a forward tandem axle differential side gear, a separate stub shaft, a separate coupling shaft, a first forward tandem axle differential output shaft and/or a shaft that is formed as part of a forward tandem axle differential side gear.

One end of the forward tandem axle system output shaft 116 is drivingly connected to a side of the inter-axle differential 112 opposite the first propeller shaft 108. The forward tandem axle system output shaft 116 extends from the forward tandem axle system 110 to a rear tandem axle differential 138 of a rear tandem axle system 140. As illustrated in FIG. 2, the end of the forward tandem axle system output shaft 116 opposite the forward tandem axle system 110 is drivingly connected to the rear tandem axle differential 138. The forward tandem axle system output shaft 116 may be connected to the rear tandem axle differential 138 though one or more of the following components (not shown) a drive shaft, a propeller shaft, a stub shaft, a coupling shaft, a rear tandem axle system input shaft, a pinion gear shaft and/or a rear tandem axle differential input shaft. The rear tandem axle differential 138 is a set of gears that allows the outer drive wheel(s) of a wheeled vehicle 100 to rotate at a faster rate than the inner drive wheel(s). The rotational power is transmitted through the rear tandem axle system 140 as described in more detail below.

The rear tandem axle system 140 further includes a first rear tandem axle half shaft 142 and a second rear tandem axle half shaft 144. The first rear tandem axle half shaft 142 extends substantially perpendicular to the forward tandem axle system output shaft 116. A first end 146 of the first rear tandem axle half shaft 142 is drivingly connected to a first rear tandem axle wheel assembly 148 and a second end 150 of the first rear tandem axle half shaft 142 is drivingly connected to an end of the rear tandem axle differential 138. As a non-limiting example, the second end 150 of the first rear tandem axle half shaft 142 is drivingly connected to a rear tandem axle differential side gear, a separate stub shaft, a separate coupling shaft, a first rear tandem axle half shaft axle disconnect system, a first rear tandem axle differential output shaft and/or a shaft that is formed as part of a rear tandem axle differential side gear.

Extending substantially perpendicular to the forward tandem axle system output shaft 116 is the second rear tandem axle half shaft 144. A first end 152 of the second rear tandem axle half shaft 144 is drivingly connected to a second rear tandem axle wheel assembly 154 and a second end 156 of the second rear tandem axle half shaft 144 is drivingly connected to an end of the rear tandem axle differential 138 opposite the first rear tandem axle half shaft 142. As a non-limiting example, the second end 156 of the second rear tandem axle half shaft 144 is drivingly connected to a rear tandem axle differential side gear, a separate stub shaft, a separate coupling shaft, a second rear tandem axle half shaft axle disconnect system, a second rear tandem axle differential output shaft and/or a shaft that is formed as part of a rear tandem axle differential side gear.

In accordance with an embodiment of the disclosure, the rear tandem axle system 140 of the vehicle 100 may further include a first rear tandem axle half shaft disconnect system 158 and/or a second rear tandem axle half shaft disconnect system 160. The first rear tandem axle half shaft disconnect system 158 and the second rear tandem axle half shaft disconnect system 160 is used to selectively connect and disconnect the first rear tandem axle half shaft 142 from the rear tandem axle differential 138 and/or to selectively connect and disconnect the second rear tandem axle half shaft 144 from the rear tandem axle differential 138. When the first and/or the second rear tandem axle half shafts 142 and 144 are disconnected from the drive-line of the vehicle 100, the amount of spinning loss and friction loss decreases thereby increasing the overall efficiency of the drive-line and fuel efficiency of the vehicle 100. As a non-limiting example, first rear tandem axle half shaft disconnect system 158 and the second rear tandem axle half shaft disconnect system 160 may be a radial dog clutch or an axial dog clutch assembly.

As illustrated in FIG. 2 of the disclosure, one end of the second rear tandem axle half shaft disconnect system 160 is drivingly connected to the second end 156 of the second rear tandem axle half shaft 144. An end of the second rear tandem axle half shaft disconnect system 160 opposite the second rear tandem axle half shaft 144 is drivingly connected to a portion of the rear tandem axle differential 138 opposite the first rear tandem axle half shaft 142. As a non-limiting example, the end of the second rear tandem axle half shaft disconnect system 160 opposite the second rear tandem axle half shaft 144 is drivingly connected to a rear tandem axle differential side gear, a separate stub shaft, a separate coupling shaft, a second rear tandem axle differential output shaft and/or a shaft that is formed as part of a rear tandem axle differential side gear.

According to an embodiment of the disclosure where the vehicle 100 includes the use of the first rear tandem axle half shaft disconnect system 158, an end of the first rear tandem axle half shaft disconnect system 158 is drivingly connected to the second end 150 of the first rear tandem axle half shaft 142. An end of the first rear tandem axle half shaft disconnect system 158 opposite the first rear tandem axle half shaft 142 is drivingly connected to a portion of the rear tandem axle differential 138 opposite the second rear tandem axle half shaft disconnect system 160. As a non-limiting example, the end of the first rear tandem axle half shaft disconnect system 158 opposite the first rear tandem axle half shaft 142 is drivingly connected to a rear tandem axle differential side gear, a separate stub shaft, a separate coupling shaft, a first rear tandem axle differential output shaft and/or a shaft that is formed as part of a rear tandem axle differential side gear.

It is within the scope of this disclosure that one or more of the differential assemblies 112, 114 and 138 of the vehicle 100 may be a differential assembly according to an embodiment of the disclosure.

Figure 3:
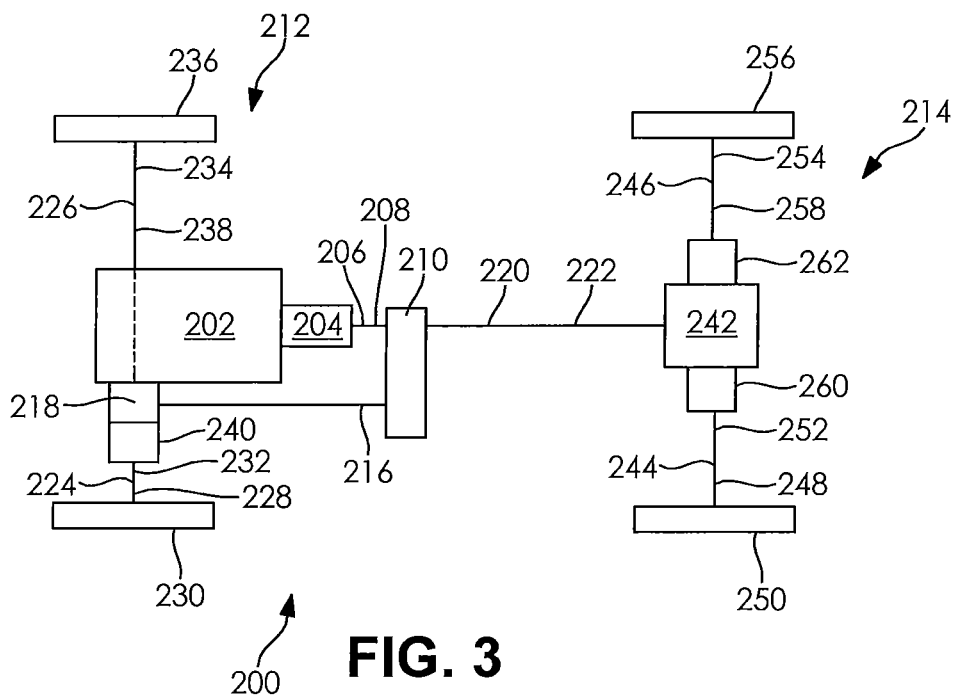
FIG. 3 is a schematic top-plan view of a vehicle having one or more differential assemblies and/or one or more axle disconnect systems according to an embodiment of the disclosure.

FIG. 3 is a schematic top-plan view of a vehicle 200 having one or more differential assemblies and/or one or more axle disconnect systems according to an embodiment of the disclosure. The vehicle 200 has an engine 202 which is drivingly connected to a transmission 204. A transmission output shaft 206 is then drivingly connected to an end of the transmission 204 opposite the engine 202. The transmission 204 is a power management system which provides controlled application of the rotational power generated by the engine 202 by means of a gear box.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and/or a rear axle system 214.

A first transfer case output shaft 216 is drivingly connected to a front axle differential 218 of the front axle system 212 and a second transfer case output shaft 220 is drivingly connected to an end of a propeller shaft 222. The front axle differential 218 is a set of gears that allows the outer drive wheel(s) of a wheeled vehicle 200 to rotate at a faster rate than the inner drive wheel(s). The rotational power is transmitted through the front axle system 212 as described in more detail below.

The front axle system 212 further includes a first front axle half shaft 224 and a second front axle half shaft 226. The first front axle half shaft 224 extends substantially perpendicular to the first transfer case output shaft 216. A first end 228 of the first front axle half shaft 224 is drivingly connected to a first front axle wheel assembly 230 and a second end 232 of the first front axle half shaft 224 is drivingly connected to an end of the front axle differential 218. As a non-limiting example, the second end 232 of the first front axle half shaft 224 is drivingly connected to a front axle differential side gear, a separate stub shaft, a separate coupling shaft, a first front axle half shaft axle disconnect system, a first front axle differential output shaft and/or a shaft that is formed as part of a front axle differential side gear.

Extending substantially perpendicular to the first transfer case output shaft 216 is the second front axle half shaft 226. A first end 234 of the second front axle half shaft 226 is drivingly connected to a second front axle wheel assembly 236 and a second end 238 of the second front axle half shaft 226 is drivingly connected to an end of the front axle differential 218 opposite the first front axle half shaft 224. As a non-limiting example, the second end 238 of the first front axle half shaft 226 is drivingly connected to a front axle differential side gear, a separate stub shaft, a separate coupling shaft, a second front axle half shaft axle disconnect system, a second front axle differential output shaft and/or a shaft that is formed as part of a front axle differential side gear.

In accordance with an embodiment of the disclosure, the front axle system 212 of the vehicle 200 may further include a first front axle half shaft disconnect system 240 and/or a second front axle half shaft disconnect system (not shown). The first front axle half shaft disconnect system 240 and the second front axle half shaft disconnect system (not shown) is used to selectively connect and disconnect the first front axle half shaft 224 from the front axle differential 218 and/or to selectively connect and disconnect the second front axle half shaft 226 from the front axle differential 218. When the first and/or the second front axle half shafts 226 and 228 are disconnected from the drive-line of the vehicle 200, the amount of spinning loss and friction loss decreases thereby increasing the overall efficiency of the drive-line and fuel efficiency of the vehicle 200. As a non-limiting example, first front axle half shaft disconnect system 240 and the second front axle half shaft disconnect system (not shown) may be a radial dog clutch or an axial dog clutch assembly.

As illustrated in FIG. 3 of the disclosure and according to an embodiment of the disclosure (not shown), one end of the second front axle half shaft disconnect system is drivingly connected to the second end of the second front axle half shaft. An end of the second front axle half shaft disconnect system opposite the second front axle half shaft is drivingly connected to a portion of the front axle differential opposite the first front axle half shaft. As a non-limiting example, the end of the second front axle half shaft disconnect system opposite the second front axle half shaft is drivingly connected to a front axle differential side gear, a separate stub shaft, a separate coupling shaft, a second front axle differential output shaft and/or a shaft that is formed as part of a front axle differential side gear.

According to an embodiment of the disclosure where the vehicle 200 includes the use of the first front axle half shaft disconnect system 240, an end of the first front axle half shaft disconnect system 240 is drivingly connected to the second end 232 of the first front axle half shaft 224. An end of the first front axle half shaft disconnect system 240 opposite the first front axle half shaft 224 is drivingly connected to a portion of the front axle differential 218 opposite the second front axle half shaft disconnect system (not shown). As a non-limiting example, the end of the first front axle half shaft disconnect system 240 opposite the first front axle half shaft 224 is drivingly connected to a front axle differential side gear, a separate stub shaft, a separate coupling shaft, a first front axle differential output shaft and/or a shaft that is formed as part of a front axle differential side gear.

The propeller shaft 222 extends from the second transfer case output shaft 220 and drivingly connects the transfer case 210 to a rear axle differential 242 of the rear axle system 214. The propeller shaft 222 may be connected to the rear axle differential 242 through one or more of the following components (not shown) a drive shaft, a stub shaft, a coupling shaft, a rear axle system input shaft, a pinion gear shaft, a rear axle differential pinion gear shaft and/or a rear axle differential input shaft. The rear axle differential 242 is a set of gears that allows the outer drive wheel(s) of a wheeled vehicle 200 to rotate at a faster rate than the inner drive wheel(s). The rotational power is transmitted through the rear axle system 214 as described in more detail below.

The rear axle system 214 further includes a first rear axle half shaft 244 and a second rear axle half shaft 246. The first rear axle half shaft 244 extends substantially perpendicular to the propeller shaft 222. A first end 248 of the first rear axle half shaft 244 is drivingly connected to a first rear axle wheel assembly 250 and a second end 252 of the first rear axle half shaft 244 is drivingly connected to an end of the rear axle differential 242. As a non-limiting example, the second end 252 of the first rear axle half shaft 244 is drivingly connected to a rear axle differential side gear, a separate stub shaft, a separate coupling shaft, a first rear axle half shaft axle disconnect system, a first rear axle differential output shaft and/or a shaft that is formed as part of a rear axle differential side gear.

Extending substantially perpendicular to the propeller shaft 22 is the second rear axle half shaft 246. A first end 254 of the second rear axle half shaft 246 is drivingly connected to a second rear axle wheel assembly 256 and a second end 258 of the second rear axle half shaft 246 is drivingly connected to an end of the rear axle differential 242 opposite the first rear axle half shaft 244. As a non-limiting example, the second end 258 of the second rear axle half shaft 246 is drivingly connected to a rear axle differential side gear, a separate stub shaft, a separate coupling shaft, a second rear axle half shaft axle disconnect system, a second rear axle differential output shaft and/or a shaft that is formed as part of a rear axle differential side gear.

In accordance with an embodiment of the disclosure, the rear axle system 214 of the vehicle 200 may further include a first rear axle half shaft disconnect system 260 and/or a second rear axle half shaft disconnect system 262. The first rear axle half shaft disconnect system 260 and the second rear axle half shaft disconnect system 262 is used to selectively connect and disconnect the first rear axle half shaft 244 from the rear axle differential 242 and/or to selectively connect and disconnect the second rear axle half shaft 246 from the rear axle differential 242. When the first and/or the second rear axle half shafts 244 and 246 are disconnected from the drive-line of the vehicle 200, the amount of spinning loss and friction loss decreases thereby increasing the overall efficiency of the drive-line and fuel efficiency of the vehicle 200. As a non-limiting example, first rear axle half shaft disconnect system 260 and the second rear axle half shaft disconnect system 262 may be a radial dog clutch or an axial dog clutch assembly.

As illustrated in FIG. 3 of the disclosure, one end of the second rear axle half shaft disconnect system 262 is drivingly connected to the second end 258 of the second rear axle half shaft 246. An end of the second rear axle half shaft disconnect system 262 opposite the second rear axle half shaft 246 is drivingly connected to a portion of the rear axle differential 242 opposite the first rear axle half shaft 244. As a non-limiting example, the end of the second rear axle half shaft disconnect system 262 opposite the second rear axle half shaft 246 is drivingly connected to a rear axle differential side gear, a separate stub shaft, a separate coupling shaft, a second rear axle differential output shaft and/or a shaft that is formed as part of a rear axle differential side gear.

According to an embodiment of the disclosure where the vehicle 200 includes the use of the first rear axle half shaft disconnect system 260, an end of the first rear axle half shaft disconnect system 260 is drivingly connected to the second end 252 of the first rear axle half shaft 244. An end of the first rear axle half shaft disconnect system 260 opposite the first rear axle half shaft 244 is drivingly connected to a portion of the rear axle differential 242 opposite the second rear axle half shaft disconnect system 262. As a non-limiting example, the end of the first rear axle half shaft disconnect system 260 opposite the first rear axle half shaft 244 is drivingly connected to a rear axle differential side gear, a separate stub shaft, a separate coupling shaft, a first rear axle differential output shaft and/or a shaft that is formed as part of a rear axle differential side gear.

It is within the scope of this disclosure that one or more of the differential assemblies 218 and 242 of the vehicle 200 may be a differential assembly according to an embodiment of the disclosure.

Figure 4:
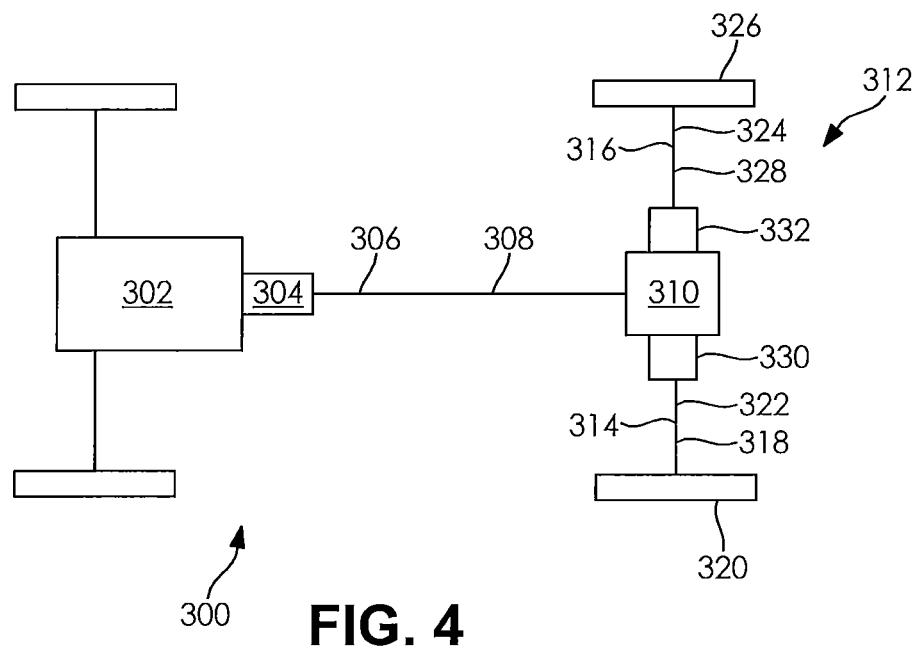
FIG. 4 is a schematic top-plan view of a vehicle having one or more differential assemblies and/or one or more axle disconnect systems according to an embodiment of the disclosure.

FIG. 4 is a schematic top-plan view of a vehicle 300 having one or more differential assemblies and/or one or more axle disconnect systems according to an embodiment of the disclosure. The vehicle 300 has an engine 302 which is drivingly connected to a transmission 304. A transmission output shaft 306 is then drivingly connected to an end of the transmission 304 opposite the engine 302. The transmission 304 is a power management system which provides controlled application of the rotational power generated by the engine 302 by means of a gear box.

An end of the transmission output shaft 306 opposite the transmission 304 is drivingly connected to a propeller shaft 308. The propeller shaft 308 extends from the transmission output shaft 306 and drivingly connects the transmission 304 to a rear axle differential 310 of the rear axle system 312. The propeller shaft 308 may be connected to the rear axle differential 310 through one or more of the following components (not shown) a drive shaft, a stub shaft, a coupling shaft, a rear axle system input shaft, a pinion gear shaft, a rear axle differential pinion gear shaft and/or a rear axle differential input shaft. The rear axle differential 310 is a set of gears that allows the outer drive wheel(s) of a wheeled vehicle 300 to rotate at a faster rate than the inner drive wheel(s). The rotational power is transmitted through the rear axle system 312 as described in more detail below.

The rear axle system 312 further includes a first rear axle half shaft 314 and a second rear axle half shaft 316. The first rear axle half shaft 314 extends substantially perpendicular to the propeller shaft 308. A first end 318 of the first rear axle half shaft 314 is drivingly connected to a first rear axle wheel assembly 320 and a second end 322 of the first rear axle half shaft 314 is drivingly connected to an end of the rear axle differential 310. As a non-limiting example, the second end 322 of the first rear axle half shaft 314 is drivingly connected to a rear axle differential side gear, a separate stub shaft, a separate coupling shaft, a first rear axle half shaft axle disconnect system, a first rear axle differential output shaft and/or a shaft that is formed as part of a rear axle differential side gear.

Extending substantially perpendicular to the propeller shaft 308 is the second rear axle half shaft 316. A first end 324 of the second rear axle half shaft 316 is drivingly connected to a second rear axle wheel assembly 326 and a second end 328 of the second rear axle half shaft 316 is drivingly connected to an end of the rear axle differential 310 opposite the first rear axle half shaft 314. As a non-limiting example, the second end 328 of the second rear axle half shaft 316 is drivingly connected to a rear axle differential side gear, a separate stub shaft, a separate coupling shaft, a second rear axle half shaft axle disconnect system, a second rear axle differential output shaft and/or a shaft that is formed as part of a rear axle differential side gear.

In accordance with an embodiment of the disclosure, the rear axle system 312 of the vehicle 300 may further include a first rear axle half shaft disconnect system 330 and/or a second rear axle half shaft disconnect system 332. The first rear axle half shaft disconnect system 330 and the second rear axle half shaft disconnect system 332 is used to selectively connect and disconnect the first rear axle half shaft 314 from the rear axle differential 310 and/or to selectively connect and disconnect the second rear axle half shaft 316 from the rear axle differential 310. When the first and/or the second rear axle half shafts 314 and 316 are disconnected from the drive-line of the vehicle 300, the amount of spinning loss and friction loss decreases thereby increasing the overall efficiency of the drive-line and fuel efficiency of the vehicle 300. As a non-limiting example, first rear axle half shaft disconnect system 330 and the second rear axle half shaft disconnect system 332 may be a radial dog clutch or an axial dog clutch assembly.

As illustrated in FIG. 4 of the disclosure, one end of the second rear axle half shaft disconnect system 332 is drivingly connected to the second end 328 of the second rear axle half shaft 316. An end of the second rear axle half shaft disconnect system 332 opposite the second rear axle half shaft 316 is drivingly connected to a portion of the rear axle differential 310 opposite the first rear axle half shaft 314. As a non-limiting example, the end of the second rear axle half shaft disconnect system 332 opposite the second rear axle half shaft 316 is drivingly connected to a rear axle differential side gear, a separate stub shaft, a separate coupling shaft, a second rear axle differential output shaft and/or a shaft that is formed as part of a rear axle differential side gear.

According to an embodiment of the disclosure where the vehicle 300 includes the use of the first rear axle half shaft disconnect system 330, an end of the first rear axle half shaft disconnect system 330 is drivingly connected to the second end 322 of the first rear axle half shaft 314. An end of the first rear axle half shaft disconnect system 330 opposite the first rear axle half shaft 314 is drivingly connected to a portion of the rear axle differential 310 opposite the second rear axle half shaft disconnect system 332. As a non-limiting example, the end of the first rear axle half shaft disconnect system 330 opposite the first rear axle half shaft 314 is drivingly connected to a rear axle differential side gear, a separate stub shaft, a separate coupling shaft, a first rear axle differential output shaft and/or a shaft that is formed as part of a rear axle differential side gear.

Figure 5:
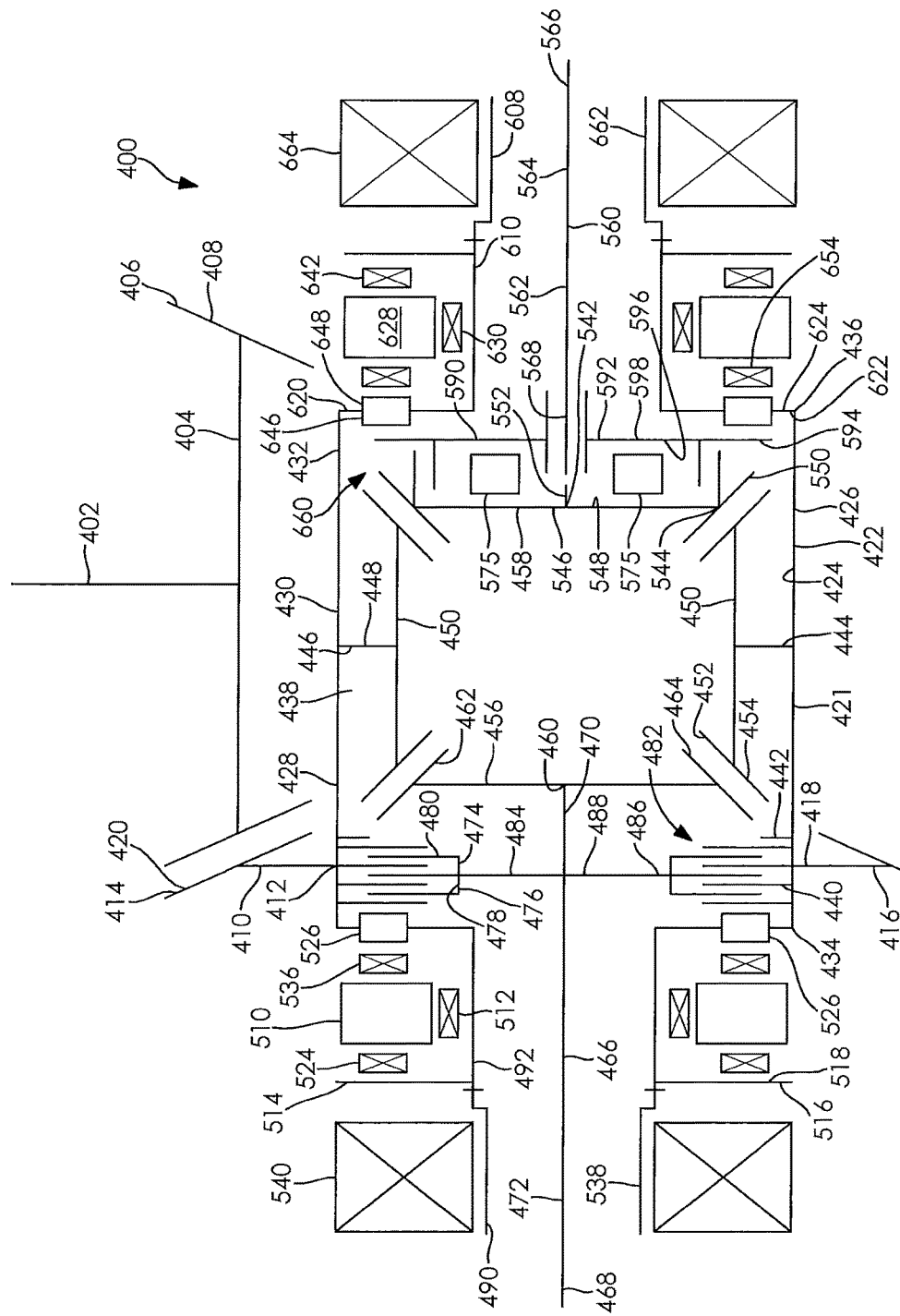
FIG. 5 is a schematic top-plan view of a differential assembly according to an embodiment of the disclosure where an axle disconnect system is in a second position.
Figure 6:
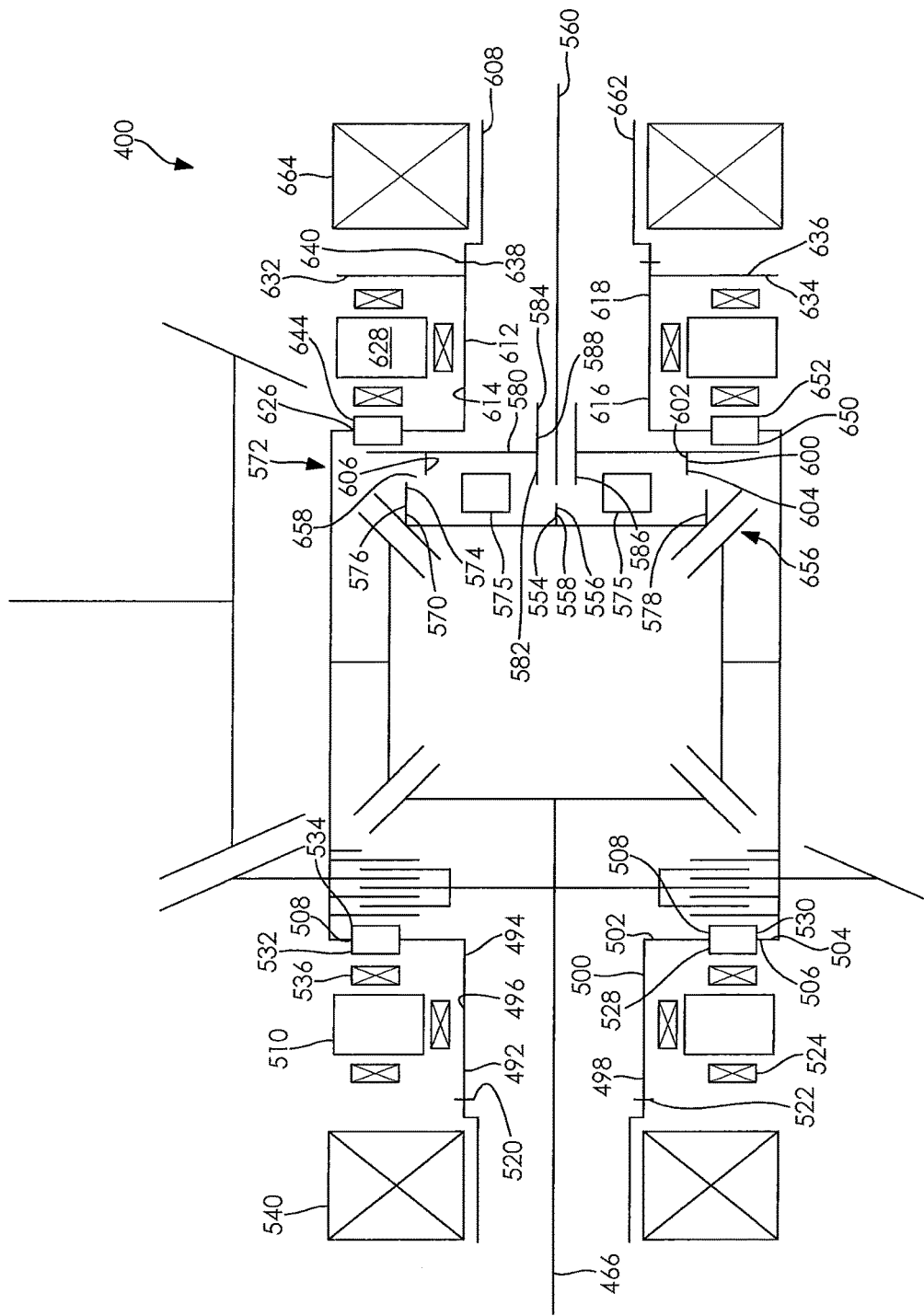
FIG. 6 is a schematic top-plan view of the differential assembly according to the embodiment of the disclosure illustrated in FIG. 5 of the disclosure where the axle disconnect system is in a first position.

FIGS. 5 and 6 are a schematic top-plan view of a differential assembly 400 according to an embodiment of the disclosure. The differential assembly 400 includes a shaft 402 that is drivingly connected a pinion gear 404. As a non-limiting example, the differential assembly 400 is a front axle differential, a rear axle differential, an inter-axle differential, a forward tandem axle differential or a rear tandem axle differential. According to an embodiment of the disclosure and as a non-limiting example, the pinion gear 404 is integrally formed as part of the shaft 402. In accordance with an alternative embodiment of the disclosure and as a non-limiting example, the pinion gear 404 is connected to the shaft 402 by using a splined connection, a threaded connection, one or more snap rings, one or more mechanical fasteners, one or more welds and/or any other method of connecting a gear to a rotatable shaft.

Circumferentially extending from at least a portion of an outer surface 406 of the pinion gear 404 is a plurality of gear teeth 408. As a non-limiting example, the plurality of gear teeth 408 on the outer surface 406 of the pinion gear 404 are a plurality of hypoid gear teeth, spiral bevel gear teeth, helical gear teeth, spur gear teeth, double hypoid gear teeth, double spiral bevel gear teeth or double helical gear teeth.

Drivingly connected to the pinion gear 404 of the differential assembly 400 is a differential ring gear 410 having an inner surface 412, an outer surface 414, an axially outboard side 416 and an axially inboard side 418. Circumferentially extending from at least a portion of the outer surface 414 of the differential ring gear 410 is a plurality of gear teeth 420 that are complementary to and meshingly engaged with the plurality of gear teeth 408 on the outer surface 406 of the pinion gear 404. As a non-limiting example, the plurality of gear teeth 420 on the outer surface 414 of the differential ring gear 410 are a plurality of hypoid gear teeth, spiral bevel gear teeth, helical gear teeth, spur gear teeth, double hypoid gear teeth, double spiral bevel gear teeth or double helical gear teeth.

At least a portion of the differential ring gear 410 is integrally connected to a large diameter intermediate portion 421 of a differential case 422. The large diameter intermediate portion 421 of the differential case 422 has an inner surface 424, an outer surface 426, a first end portion 428, an intermediate portion 430, a second end portion 432, a first end 434 and a second end 436. The inner surface 424 and the outer surface 426 of the large diameter intermediate portion 421 of the differential case 422 defines a hollow portion 438 therein. As illustrated in FIGS. 5 and 6 of the disclosure, at least a portion of the first end portion 428 of the large diameter intermediate portion 421 of the differential case 422 is integrally connected to at least a portion of the differential ring gear 410 of the differential assembly 400. As a non-limiting example, the large diameter intermediate portion 421 of the differential case 422 is substantially cylindrical in shape. According to an embodiment of the disclosure and as a non-limiting example, the large diameter intermediate portion 421 of the differential case 422 is integrally formed as part of the differential ring gear 410 of the differential assembly 400. In accordance with an alternative embodiment of the disclosure and as a non-limiting example, the large diameter intermediate portion 421 of the differential case 422 is connected to the differential ring gear 410 by using a splined connection, threaded connection, one or more snap rings, one or more mechanical fasteners, one or more welds and/or any other method of connecting a gear to a differential case.

Integrally connected to an inner surface 424 of the first end portion 428 of the large diameter intermediate portion 421 of the differential case 422 is a first plurality of clutch plates 440. The first plurality of clutch plates 422 are integrally connected to the inner surface 424 of the first end portion 428 of the large diameter intermediate portion 421 of the differential case 422 and are individually fitted to allow sliding movement in the axial direction along the inner surface 424 of the first end portion 428 of the large diameter intermediate portion 421 of the differential case 422.

Circumferentially extending radially inboard from at least a portion of the inner surface 424 of the first end portion 428 of the large diameter intermediate portion 421 of the differential case 422 is a reaction plate 442. According to an embodiment of the disclosure and as a non-limiting example, the reaction plate 442 is integrally formed as part of the inner surface 424 of the first end portion 428 of the large diameter intermediate portion 421 of the differential case 422. In accordance with an alternative embodiment of the disclosure and as a non-limiting example, the reaction plate 442 is integrally connected to the inner surface 424 of the first end portion 428 of the large diameter intermediate portion 421 of the differential case 422 by using a splined connection, threaded connection, one or more snap rings, one or more mechanical fasteners and/or one or more welds. Additionally, as illustrated in FIGS. 5 and 6 of the disclosure, the reaction plate 442 is disposed axially outboard from and adjacent to the first plurality of clutch plates 440 on the inner surface 424 of the first end portion 428 of the large diameter intermediate portion 421 of the differential case 422.

According to an alternative embodiment of the disclosure (not shown), the differential case is made of a first differential case component and a second differential case component. In accordance with this embodiment of the disclosure, at least a portion of the first differential case component is integrally connected to at least a portion of the first side of the differential ring gear and at least a portion of the second differential case component is integrally connected to at least a portion of the second side of the differential ring gear. As a non-limiting example, the first and the second differential case components are integrally connected to the differential ring gear by using a splined connection, threaded connection, one or more snap rings, one or more mechanical fasteners, one or more welds and/or any other method of connecting a gear to a differential case.

Additionally, according to this embodiment of the disclosure (not shown), at least a portion of the first plurality of clutch plates are integrally connected to at least a portion of an inner surface of the first differential case component, the differential ring gear and/or the second differential case component. As previously discussed, the first plurality of clutch plates are individually fitted to allow sliding movement in the axial direction along the inner surfaces of the first differential case component, the differential ring gear and/or the second differential case component.

Finally, in accordance with this embodiment of the disclosure (not shown), the reaction plate circumferentially extends from at least a portion of the inner surface of the second differential case component axially inboard from and adjacent to the first plurality of clutch plates.

Integrally connected to at least a portion of the inner surface 424 of the intermediate portion 430 of the large diameter intermediate portion 421 of the differential case is one or more spider shafts 444 having a first end portion 446 and a second end portion 448. As illustrated in FIGS. 5 and 6 of the disclosure, the one or more spider shafts 444 extend radially inboard from the inner surface 424 of the intermediate portion 430 of the large diameter intermediate portion 421 of the differential case 422.

Rotatively connected to at least a portion of the second end portion 448 of the one or more spider shafts 444 is one or more differential pinion gears 450. Circumferentially extending from at least a portion of an outer surface 452 of the one or more differential pinion gears 450 is a plurality of gear teeth 454. As a non-limiting example, the plurality of gear teeth 454 on the outer surface 452 of the one or more differential pinion gears 450 are a plurality of hypoid gear teeth, spiral bevel gear teeth, helical gear teeth, spur gear teeth, double hypoid gear teeth, double spiral bevel gear teeth or double helical gear teeth. The one or more spider shafts 444 rotationally support the one or more differential pinion gears 450 on the inner surface 424 of the large diameter intermediate portion 421 of the differential case 422.

Drivingly connected to the one or more differential pinion gears 450 is a first differential side gear 456 and a second differential side gear 458. As illustrated in FIGS. 5 and 6 of the disclosure, the first differential side gear 456 has an inner surface 460 and an outer surface 462. Circumferentially extending from at least a portion of the outer surface 462 of the first side gear 456 is a plurality of gear teeth 464 that are complementary to and meshingly engaged with the plurality of gear teeth 454 on the outer surface 452 of the one or more differential pinion gears 450. As a non-limiting example, the plurality of gear teeth 464 on the outer surface 462 of the first differential side gear 456 are a plurality of hypoid gear teeth, spiral bevel gear teeth, helical gear teeth, spur gear teeth, double hypoid gear teeth, double spiral bevel gear teeth or double helical gear teeth.

Integrally connected to at least a portion of the inner surface 460 of the first differential side gear 456 is a first differential output shaft 466 having a first end portion 468, a second end portion 470 and an outer surface 472. As illustrated in FIGS. 5 and 6 of the disclosure, at least a portion of the second end portion 470 of the first differential output shaft 466 is integrally connected to at least a portion of the inner surface 460 of the first differential side gear 456. According to an embodiment of the disclosure and as a non-limiting example, the first differential output shaft 466 is integrally formed as part of the first differential side gear 456. In accordance with an alternative embodiment of the disclosure and as a non-limiting example, at least a portion of the second end portion 470 of the first differential output shaft 466 is integrally connected to the first differential side gear 456 by using a splined connection, a threaded connection, one or more snap rings, one or more mechanical fasteners, one or more welds and/or any other method of connecting a gear to a rotatable shaft. Additionally, according to yet another embodiment of the disclosure, the first differential output shaft 466 may be a coupling shaft, a stub shaft or a first axle half shaft.

Disposed within the hollow portion 438 of the large diameter intermediate portion 421 of the differential case 422 is a clutch can 474 having an inner surface 476 and an outer surface 478. The clutch can 474 extends co-axially with at least a portion of the large diameter intermediate portion 421 of the differential case 422 and the first differential output shaft 466. As illustrated in FIGS. 5 and 6 of the disclosure and as a non-limiting example, the clutch can 474 is substantially cylindrical in shape.

Integrally connected to at least a portion of the outer surface 478 of the clutch can 474 is a second plurality of clutch plates 480 that are interleafed with the first plurality of clutch plates 440 extending from the inner surface 424 of the large diameter intermediate portion 421 of the differential case 422. The second plurality of clutch plates 480 are integrally connected to the outer surface 478 of the clutch can 474 and are individually fitted to allow sliding movement in the axial direction along the outer surface 478 of the clutch can 474. The first plurality of clutch plates 440 and the second plurality of clutch plates 480 form a clutch pack 482.

Drivingly connecting the clutch can 474 to the first differential output shaft 466 is a radially extending portion 484 having a first end portion 486 and a second end portion 488. At least a portion of the first end portion 486 of the radially extending portion 484 is integrally connected to at least a portion of the inner surface 476 of the clutch can 474. According to an embodiment of the disclosure and as a non-limiting example, the radially extending portion 484 is integrally formed as part of the clutch can 474. In accordance with an alternative embodiment of the disclosure and as a non-limiting example, the radially extending portion 484 is connected to the clutch can 474 by using a splined connection, a threaded connection, one or more snap rings, one or more mechanical fasteners, one or more welds and/or any other method of connecting the two components together.

The radially extending portion 484 extends radially inboard from the clutch can 474 to the first differential output shaft 466 of the differential assembly 400. At least a portion of the second end portion 488 of the radially extending portion 484 is integrally connected to at least a portion of the outer surface 472 of the first end portion 470 of the first differential output shaft 466. According to an embodiment of the disclosure and as a non-limiting example, the radially extending portion 484 is integrally formed as part of the first end portion 470 of the first differential output shaft 466. In accordance with an alternative embodiment of the disclosure and as a non-limiting example, the radially extending portion 484 is connected to the first end portion 470 of the first differential output shaft 466 by using a splined connection, a threaded connection, one or more snap rings, one or more mechanical fasteners, one or more welds and/or any other method of connecting the two components together.

A first end portion 490 of the differential case 422 axially outboard from and adjacent to the first end 434 of the large diameter intermediate portion 421 of the differential case 422 is a first reduced diameter portion 492 having an inner surface 494, an outer surface 496, a first end portion 498 and a second end portion 500. As illustrated in FIGS. 5 and 6 of the disclosure, the first reduced diameter portion 492 of the first end portion 490 of the differential case 422 is substantially cylindrical in shape and extends co-axially with at least a portion of the first differential output shaft 466.

Connecting the first end 434 of the large diameter intermediate portion 421 of the differential case 422 to the first reduced diameter portion 492 of the first end portion 490 of the differential case 422 is a first radially extending wall 502 having an inner surface 504 and an outer surface 506. As illustrated in FIGS. 5 and 6 of the disclosure, the first radially extending wall 502 of the differential case 422 is substantially perpendicular to the large diameter intermediate portion 421 and the first reduced diameter portion 492 of the first end portion 490 of the differential case 422.

Extending from the inner surface 504 to the outer surface 506 of the first radially extending wall 502 is one or more openings 508.

Disposed radially outboard from the first reduced diameter portion 492 of the first end portion 490 of the differential case 422 is a first clutch actuation mechanism 510. As a non-limiting example, the first clutch actuation mechanism 510 of the differential assembly 400 is a pneumatic actuator, a hydraulic actuator, an electromagnetic actuator, a ball and ramp actuator that is driven by an electric motor or any other type of actuation mechanism.

Located radially inboard from the first clutch actuation mechanism 510 and between the first clutch actuation mechanism 510 and the first reduced diameter portion 492 of the first end portion 490 of the differential case 422 is a bearing 512. The bearing 512 provides rotational support for the first clutch actuation mechanism 510 and allows for relative rotation between the first clutch actuation mechanism 510 and the first reduced diameter portion 492 of the first end portion 490 of the differential case 422. Additionally, the bearing 512 is used to reduce the amount of friction between the first clutch actuation mechanism 510 and the first reduced diameter portion 492 of the first end portion 490 of the differential case 422 when in operation. As a non-limiting example, the bearing 512 may be a needle bearing, a bushing or a rolling element bearing.

Extending radially outboard from the outer surface 496 of the first end portion 498 of the first reduced diameter portion 492 of the first end portion 490 of the differential case 422 is a first radially extending thrust wall 514 having a first side 516 and a second side 518. As illustrated in FIGS. 5 and 6 of the disclosure, the first radially extending thrust wall 514 is disposed axially outboard from the first clutch actuation mechanism 510. According to an embodiment of the disclosure and as a non-limiting example, the first radially extending thrust wall 514 is integrally formed as part of the first end portion 498 of the first reduced diameter portion 492 of the first end portion 490 of the differential case 422. In accordance with an alternative embodiment of the disclosure and as a non-limiting example, the first radially extending thrust wall 514 is connected to the first end portion 498 of the first reduced diameter portion 492 of the first end portion 490 of the differential case 422 by using a splined connection, a threaded connection, one or more snap rings, one or more mechanical fasteners, one or more welds and/or any other method of connecting the two components together. It is within the scope of this disclosure, that the first radially extending thrust wall 514 may form part of a differential housing (not shown).

According to an embodiment of the disclosure, a snap ring channel 520 extends circumferentially along at least a portion of the outer surface 496 of the first end portion 498 of the first reduced diameter portion 492 of the first end portion 490 of the differential case 422. In accordance with this embodiment of the disclosure at least a portion of a snap ring 522 is disposed within the snap ring groove 520. The snap ring 522 is used to ensure that the first radially extending thrust wall 514 remains on the first reduced diameter portion 492 of the first end portion 490 of the differential case 422 when the differential assembly 400 is in operation.

Disposed between the first clutch actuation mechanism 510 and the second side 518 of the first radially extending thrust wall 514 is a first axial thrust bearing 524. The first axial thrust bearing 524 allows for relative rotation between the first clutch actuation mechanism 510 and the first radially extending thrust wall 514. Additionally, the first axial thrust bearing 524 reduces the amount of friction between the first clutch actuation mechanism 510 and the first radially extending thrust wall 514 of the differential assembly 400 when in operation.

Disposed axially inboard from the first radially extending thrust wall 514, the first axial thrust bearing 524 and the first clutch actuation mechanism 510 is one or more thrust pins 526 having a first end portion 528, a second end portion 530, a first end 532 and a second end 534. As illustrated in FIGS. 5 and 6 of the disclosure, the one or more thrust pins 526 extend through the one or more openings 508 in the first radially extending wall 502. At least a portion of the first end portion 528 of the one or more thrust pins 526 extends outside the differential case 422 and at least a portion of the second end portion 530 of the one or more thrust pins 526 extends within the hollow portion 438 of the large diameter intermediate portion 421 of a differential case 422.

Interposed between the first clutch actuation mechanism 510 and the one or more thrust pins 526 is a second axial thrust bearing 536. The second axial thrust bearing 536 allows for relative rotation between the first clutch actuation mechanism 510 and the one or more thrust pins 526. Additionally, the second axial thrust bearing 536 reduces the amount of friction between the first clutch actuation mechanism 510 and the one or more thrust pins 526 of the differential assembly 400.

In operation, the first clutch actuation mechanism 510 applies a force onto an end of the second axial thrust bearing 536 opposite the one or more thrust pins 526 till the one or more thrust pins 526 come into direct contact with the first plurality of clutch plates 440 and/or the second plurality of clutch plates 480 thereby causing the first and the second plurality of clutch plates 440 and 480 to be at least variably frictionally engaged. This allows a variable amount of rotational energy or torque to be transferred to a first wheel assembly (not shown).

Axially outboard from the first reduced diameter portion 492 of the first end portion 490 of the differential case 422 is a second reduced diameter portion 538. As illustrated in FIGS. 5 and 6 of the disclosure, the second reduced diameter portion 538 of the first end portion 490 of the differential case 422 is substantially cylindrical in shape and extends co-axially with the first differential output shaft 466 of the differential assembly 400.

Disposed radially outboard from and rotationally connected to the second reduced diameter portion 538 of the first end portion 490 of the differential case 422 is a bearing 540. The bearing 540 rotationally supports the first end portion 490 of the differential case 422 and allows for relative rotation between the differential case 422 and the first differential output shaft 466.

As illustrated in FIGS. 5 and 6 of the disclosure, the second differential side gear 458 has an inner surface 542, an outer surface 544, an axially inboard side 546 and an axially outboard side 548. Circumferentially extending from at least a portion of the outer surface 544 of the second side gear 458 is a plurality of gear teeth 550 that are complementary to and meshingly engaged with the plurality of gear teeth 454 on the outer surface 452 of the one or more differential pinion gears 450. As a non-limiting example, the plurality of gear teeth 550 on the outer surface 544 of the second differential side gear 458 are a plurality of hypoid gear teeth, spiral bevel gear teeth, helical gear teeth, spur gear teeth, double hypoid gear teeth, double spiral bevel gear teeth or double helical gear teeth.

Integrally connected to at least a portion of the inner surface 542 of the second differential side gear 458 is a stub shaft 552 having a first end portion 554, a second end portion 556 and an outer surface 558. As illustrated in FIGS. 5 and 6 of the disclosure, at least a portion of the first end portion 554 of the stub shaft 552 is integrally connected to at least a portion of the inner surface 542 of the second differential side gear 458. According to an embodiment of the disclosure and as a non-limiting example, the stub shaft 552 is integrally formed as part of the second differential side gear 458. In accordance with an alternative embodiment of the disclosure and as a non-limiting example, at least a portion of the first end portion 554 of the stub shaft 554 is integrally connected to the second differential side gear 458 by using a splined connection, a threaded connection, one or more snap rings, one or more mechanical fasteners, one or more welds and/or any other method of connecting a gear to a rotatable shaft.

Rotationally connected to at least a portion of the second end portion 556 of the stub shaft 552 of the differential assembly 400 is a second differential output shaft 560 having a first end portion 562, a second end portion 564 and an outer surface 566. The second differential output shaft 560 of the differential assembly 400 extends co-axially with the stub shaft 552. As illustrated in FIGS. 5 and 6 of the disclosure, the second end portion 556 of the stub shaft 552 is rotationally connected to at least a portion of the first end portion 562 of the second differential output shaft 560. As a non-limiting example, the second differential output shaft 560 may be a coupling shaft, a stub shaft or a second axle half shaft.

Circumferentially extending from at least a portion of the outer surface 566 of the first end portion 562 of the second differential output shaft 560 is a plurality of splines 568. The plurality of splines 568 extend axially along the outer surface 566 of the first end portion 562 of the second differential output shaft 560.

According to an embodiment of the disclosure (not shown) and as a non-limiting example, the second end portion of the stub shaft has a reduced diameter portion that is at least partially disposed within a hollow portion in the first end portion of the second differential output shaft. In accordance with this embodiment of the disclosure (not shown), the reduced diameter portion of the second end portion of the stub shaft is received within a bearing that is disposed within the hollow portion of the first end portion of the second differential output shaft. The bearing disposed within the follow portion of the first end portion of the second differential output shaft allows for relative rotation and reduces the amount of friction between the stub shaft and the second differential output shaft.

In accordance with an alternative embodiment of the disclosure (not shown) and as a non-limiting example, the first end portion of the second differential output shaft has a reduced diameter portion that is at least partially disposed within a hollow portion in the second end portion of the stub shaft. According to this embodiment of the disclosure (not shown), the reduced diameter portion of the first end portion of the second differential output shaft is received within a bearing that is disposed within the hollow portion of the second end portion of the stub shaft. The bearing disposed within the follow portion of the second end portion of the stub shaft allows for relative rotation and reduces the amount of friction between the stub shaft and the second differential output shaft.

Extending axially outboard from the axially outboard side 548 of the second differential side gear 458 is a first portion 570 of a clutching assembly 572. In accordance with an embodiment of the disclosure and as a non-limiting example, the clutching assembly 572 is a radial dog clutch assembly. The first portion 570 of the clutching assembly 572 has an inner surface 574 and an outer surface 576. As illustrated in FIGS. 5 and 6 of the disclosure, the first portion 570 of the clutching assembly 572 is substantially cylindrical in shape and extends co-axially with the stub shaft 552 and the second differential output shaft 560.

Circumferentially extending from at least a portion of the inner surface 574 of the first portion 570 of the clutching assembly 572 is a plurality of clutch teeth 578. The plurality of clutch teeth 578 extend axially along the inner surface 574 of the first portion 570 of the clutching assembly 572. As a non-limiting example, the plurality of clutch teeth 578 on the inner surface 574 of the first portion 570 of the clutching assembly 572 are a plurality of dog clutch teeth.

Axially outboard from the first portion 570 of the clutching assembly 572 is a second portion 580 of the clutching assembly 572. As illustrated in FIGS. 5 and 6 of the disclosure, the first portion 570 and the second portion 580 of the clutching assembly 572 are disposed within the hollow portion 438 of the large diameter intermediate portion 421 of the differential case 422.

The second portion 580 of the clutching assembly 572 includes a sliding collar 582 having an inner surface 584 and an outer surface 586. As illustrated in FIGS. 5 and 6 of the disclosure, the sliding collar 582 is substantially cylindrical in shape and extends co-axially with the second differential output shaft 560. Circumferentially extending from at least a portion of the inner surface 584 of the sliding collar 582 of the second portion 580 of the clutching assembly 572 is a plurality of splines 588. The plurality of splines 588 on the inner surface 584 of the sliding collar 582 are complementary to and meshingly engaged with the plurality of splines 568 on the outer surface 566 of the first end portion 562 of the second differential output shaft 560. The sliding collar 582 of the second portion 580 of the clutching assembly 572 is therefore able to slide axially along the outer surface 566 of the second differential output shaft 560. As a result, the sliding collar 582 of the second portion 580 of the clutching assembly 572 is slidingly engaged and drivingly engaged with the second differential output shaft 560.

Extending radially outboard from at least a portion of the outer surface 586 of the sliding collar 582 of the second portion 580 of the clutching assembly 572 is a radially extending wall portion 590 having a first end portion 592, a second end portion 594, an axially inboard side 596 and an axially outboard side 598. As illustrated in FIGS. 5 and 6 of the disclosure, the radially extending wall portion 590 is substantially disc shaped. According to an embodiment of the disclosure, the radially extending wall portion 590 is integrally formed as part of the outer surface 586 of the sliding collar 582 of the second portion 580 of the clutching assembly 572. In accordance with an alternative embodiment of the disclosure and as a non-limiting example, the radially extending wall portion 590 is connected to outer surface 586 of the sliding collar 582 of the second portion 580 of the clutching assembly 572 by using a splined connection, a threaded connection, one or more snap rings, one or more mechanical fasteners, one or more welds and/or any other method of connecting the two components together.

Circumferentially extending axially inboard from at least a portion of the axially inboard side 596 of the second end portion 594 of the wall portion 590 is a substantially cylindrical portion 600 having an inner surface 602 and an outer surface 604. As illustrated in FIGS. 5 and 6 of the disclosure, the substantially cylindrical portion 600 extends co-axially with the stub shaft 552 and the second differential output shaft 560 of the differential assembly 400. A plurality of clutch teeth 606 extend axially along the inner surface 602 of the substantially cylindrical portion 590 of the second portion 580 of the clutching assembly 572. The plurality of clutch teeth 606 are complementary to and selectively meshingly engageable with the plurality of clutch teeth 578 on the inner surface 574 of the first portion 570 of the clutching assembly 572. As a non-limiting example the plurality of clutch teeth 606 on the inner surface 602 of the substantially cylindrical portion 590 of the second portion 580 of the clutching assembly 572 are a plurality of dog clutch teeth.

A second end portion 608 of the differential case 422, axially outboard from and adjacent to the second end 436 of the large diameter intermediate portion 421 of the differential case 422, is a first reduced diameter portion 610 having an inner surface 612, an outer surface 614, a first end portion 616 and a second end portion 618. As illustrated in FIGS. 5 and 6 of the disclosure, the first reduced diameter portion 610 of the second end portion 608 of the differential case 422 is substantially cylindrical in shape and extends co-axially with at least a portion of the stub shaft 552 and the second differential output shaft 560.

Connecting the second end 436 of the large diameter intermediate portion 421 of the differential case 422 to the first reduced diameter portion 610 of the second end portion 608 of the differential case 422 is a second radially extending wall 620 having an inner surface 622 and an outer surface 624. As illustrated in FIGS. 5 and 6 of the disclosure, the second radially extending wall 620 of the differential case 422 is substantially perpendicular to the large diameter intermediate portion 421 and the first reduced diameter portion 492 second end portion 608 of the differential case 422.

Extending from the inner surface 622 to the outer surface 624 of the second radially extending wall 620 is one or more openings 626.

Disposed radially outboard from the first reduced diameter portion 610 of the second end portion 608 of the differential case 422 is a second clutch actuation mechanism 628. As a non-limiting example, the second clutch actuation mechanism 628 of the differential assembly 400 is a pneumatic actuator, a hydraulic actuator, an electromagnetic actuator, a ball and ramp actuator that is driven by an electric motor or any other type of actuation mechanism.

Located radially inboard from the second clutch actuation mechanism 628 and between the second clutch actuation mechanism 628 and the first reduced diameter portion 610 of the second end portion 608 of the differential case 422 is a bearing 630. The bearing 630 provides rotational support for the second clutch actuation mechanism 628 and allows for relative rotation between the second clutch actuation mechanism 628 and the first reduced diameter portion 610 of the second end portion 608 of the differential case 422. Additionally, the bearing 630 is used to reduce the amount of friction between the second clutch actuation mechanism 628 and the first reduced diameter portion 610 of the second end portion 608 of the differential case 422 when in operation. As a non-limiting example, the bearing 630 may be a needle bearing, a bushing or a rolling element bearing.

Extending radially outboard from the outer surface 614 of the second end portion 618 of the first reduced diameter portion 610 of the second end portion 608 of the differential case 422 is a second radially extending thrust wall 632 having a first side 634 and a second side 636. As illustrated in FIGS. 5 and 6 of the disclosure, the second radially extending thrust wall 632 is disposed axially outboard from the second clutch actuation mechanism 628. According to an embodiment of the disclosure and as a non-limiting example, the second radially extending thrust wall 632 is integrally formed as part of the second end portion 618 of the first reduced diameter portion 610 of the second end portion 608 of the differential case 422. In accordance with an alternative embodiment of the disclosure and as a non-limiting example, the second radially extending thrust wall 632 is connected to the second end portion 618 of the first reduced diameter portion 610 of the second end portion 608 of the differential case 422 by using a splined connection, a threaded connection, one or more snap rings, one or more mechanical fasteners, one or more welds and/or any other method of connecting the two components. It is within the scope of this disclosure, that the second radially extending thrust wall 632 may form part of a differential housing (not shown).

According to an embodiment of the disclosure, a snap ring channel 638 extends circumferentially along at least a portion of the outer surface 614 of the second end portion 618 of the first reduced diameter portion 610 of the second end portion 608 of the differential case 422. In accordance with this embodiment of the disclosure at least a portion of a snap ring 640 is disposed within the snap ring groove 638. The snap ring 640 is used to ensure that the second radially extending thrust wall 632 remains on the first reduced diameter portion 610 of the second end portion 608 of the differential case 422 when the differential assembly 400 is in operation.

Disposed between the second clutch actuation mechanism 628 and the first side 634 of the second radially extending thrust wall 632 is a third axial thrust bearing 642. The third axial thrust bearing 642 allows for relative rotation between the second clutch actuation mechanism 628 and the second radially extending thrust wall 632. Additionally, the third axial thrust bearing 642 reduces the amount of friction between the second clutch actuation mechanism 628 and the second radially extending thrust wall 632 of the differential assembly 400 when in operation.

Disposed axially inboard from the second radially extending thrust wall 632, the third axial thrust bearing 642 and the second clutch actuation mechanism 628 is one or more thrust pins 644 having a first end portion 646, a second end portion 648, a first end 650 and a second end 652. As illustrated in FIGS. 5 and 6 of the disclosure, the one or more thrust pins 648 extend through the one or more openings 626 in the second radially extending wall 620 of the second end portion 608 of the differential case 422. At least a portion of the second end portion 648 of the one or more thrust pins 644 extend outside the differential case 422 and at least a portion of the first end portion 646 of the one or more thrust pins 644 extend within the hollow portion 438 of the large diameter intermediate portion 421 of a differential case 422.

Interposed between the second clutch actuation mechanism 628 and the one or more thrust pins 644 is a fourth axial thrust bearing 654. The fourth axial thrust bearing 654 allows for relative rotation between the second clutch actuation mechanism 628 and the one or more thrust pins 644. Additionally, the fourth axial thrust bearing 654 reduces the amount of friction between the second clutch actuation mechanism 628 and the one or more thrust pins 644 of the differential assembly 400.

In operation, the second clutch actuation mechanism 628 applies a force onto an end of the fourth axial thrust bearing 654 opposite the one or more thrust pins 644 till the one or more thrust pins 644 come into direct contact with the second portion 580 of the clutching assembly 572. The second clutch actuation mechanism 628 then moves the second portion 580 of the clutching assembly 572 axially from a first position 656 illustrated in FIG. 6 to a second position 660 illustrated in FIG. 5 of the disclosure. When in the first position 656 illustrated in FIG. 6, the plurality of clutch teeth 606 on the outer surface 606 of the substantially cylindrical portion 600 of the second portion 580 of the clutching assembly 572 are not meshingly engaged with the plurality of clutch teeth 578 on the inner surface 574 of the first portion 570 of a clutching assembly 572 defining a gap 658 there between. When in the second position 660 illustrated in FIG. 5, the plurality of clutch teeth 606 on the outer surface 606 of the substantially cylindrical portion 600 of the second portion 580 of the clutching assembly 572 are meshingly engaged with the plurality of clutch teeth 578 on the inner surface 574 of the first portion 570 of a clutching assembly 572. As a result, the second portion 580 of the clutching assembly 572 is selectively engageable with the second differential side gear 458, allowing the second differential output shaft 560 to be selectively connected and disconnected from the differential assembly 400.

In accordance with an embodiment of the disclosure, interposed between the radially extending wall portion 590 of the second portion 580 of the clutching assembly 572 and the axially outboard side 548 of the second differential side gear 458 is one or more biasing members 575. As a non-limiting example, the one or more biasing members 575 are a wave spring, a helical spring or any other device that is able to store mechanical energy. When the clutching assembly is in the second position 660 illustrated in FIG. 5 of the disclosure, the one or more biasing members 575 are compressed loading the one or more biasing members 575 with energy. When the force from the second clutch actuation mechanism 628 is released, the one or more biasing members 575 drive the second portion 580 of the clutching assembly 572 axially outboard from the second differential side gear 458 to the first position 652 illustrated in FIG. 6 of the disclosure.

Axially outboard from the first reduced diameter portion 610 of the second end portion 608 of the differential case 422 is a second reduced diameter portion 662. As illustrated in FIGS. 5 and 6 of the disclosure, the second reduced diameter portion 662 of the second end portion 608 of the differential case 422 is substantially cylindrical in shape and extends co-axially with the second differential output shaft 560 of the differential assembly 400.

Disposed radially outboard from and rotationally connected to the second reduced diameter portion 662 of the second end portion 608 of the differential case 422 is a bearing 664. The bearing 664 rotationally supports the second end portion 608 of the differential case 422 and allows for relative rotation between the differential case 422 and the second differential output shaft 560.

Figure 7:
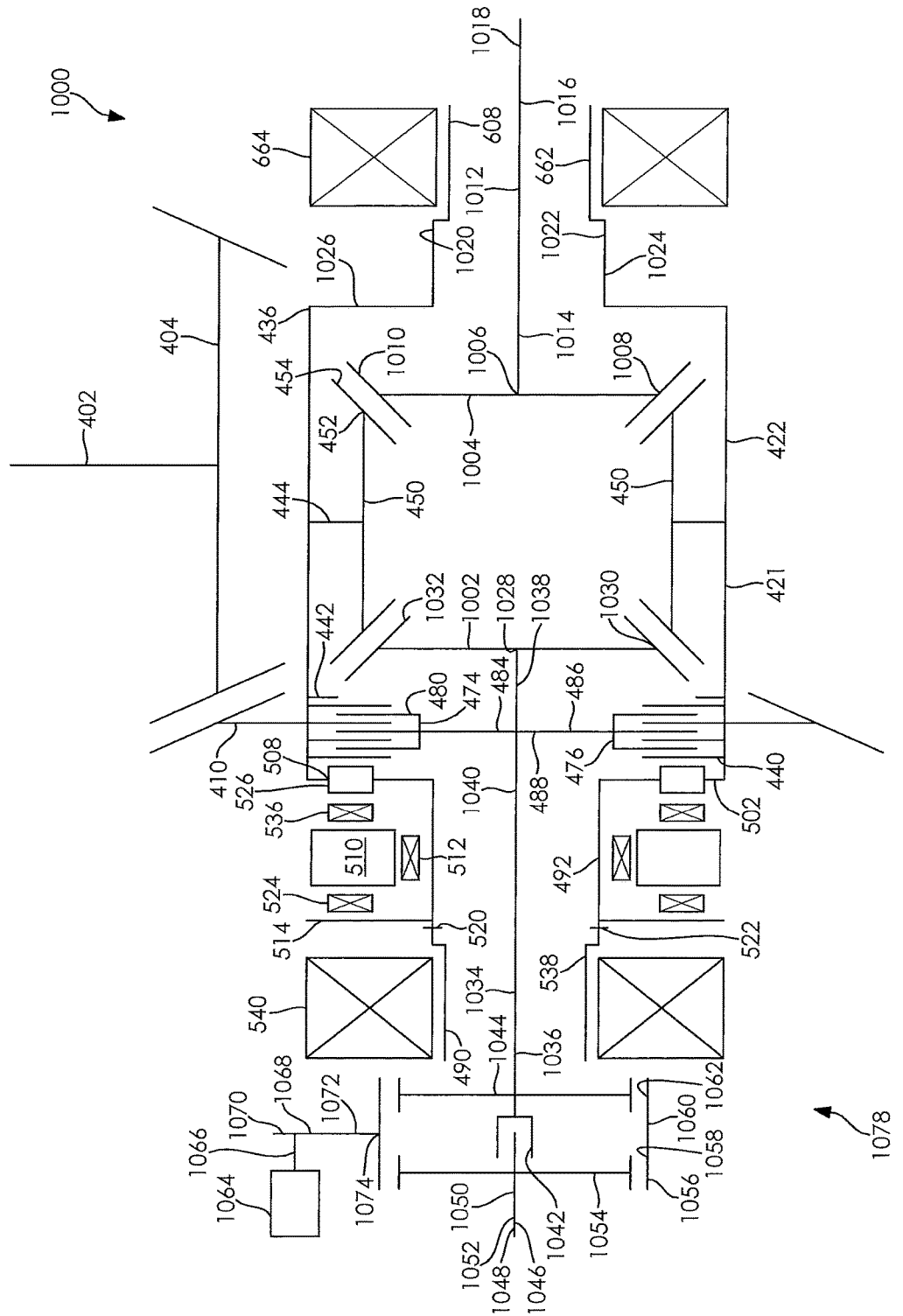
FIG. 7 is a schematic top-plan view of a differential assembly according to another embodiment of the disclosure where an axle disconnect system is in a second position.
Figure 8:
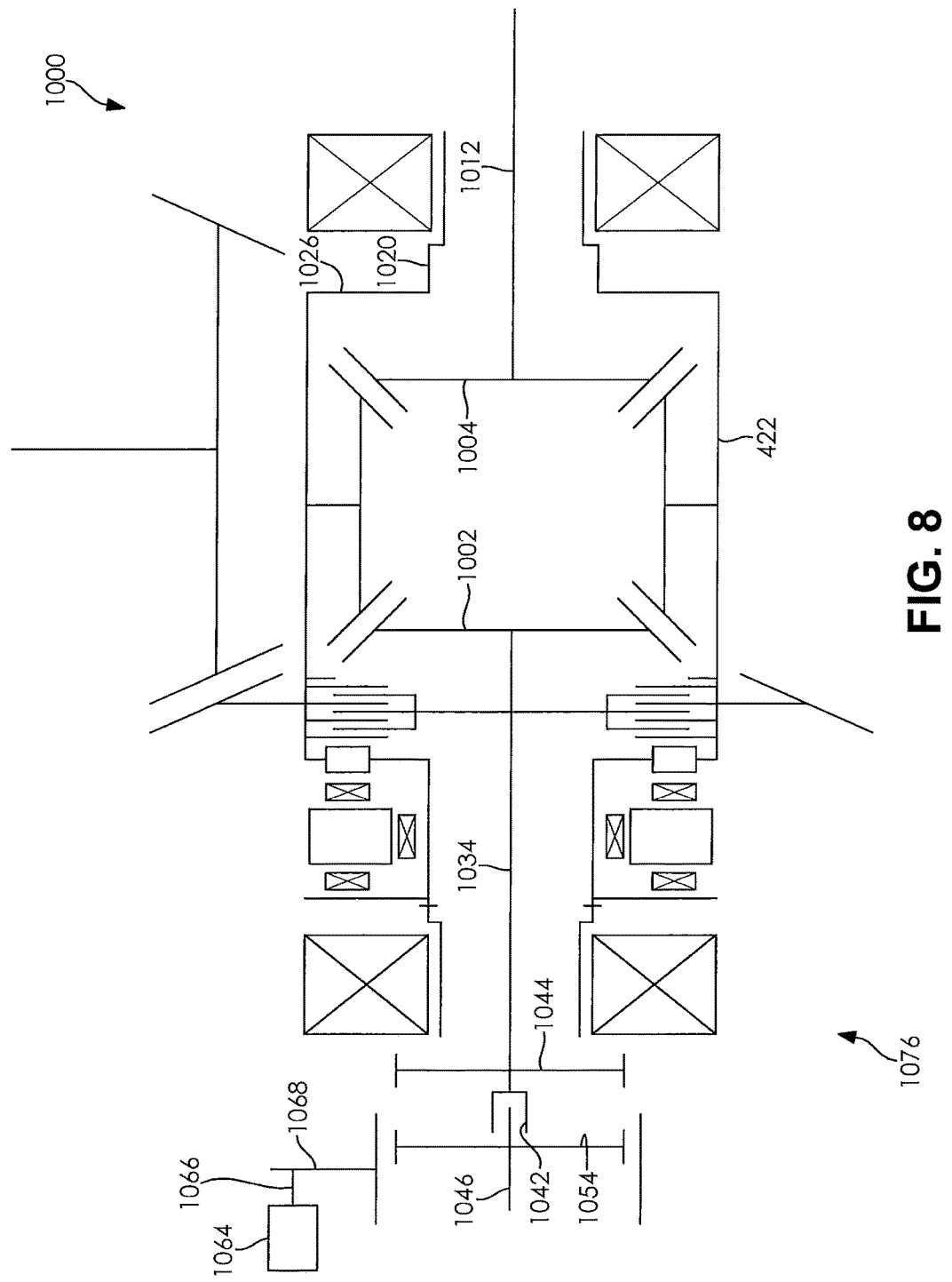
FIG. 8 is a schematic top-plan view of the differential assembly illustrated in FIG. 7 of the disclosure where the axle disconnect system is in a first position.

FIGS. 7 and 8 are a schematic top-plan view of a differential assembly 1000 according to another embodiment of the disclosure. The differential assembly illustrated in FIGS. 7 and 8 are the same as the differential assembly 400 illustrated in FIGS. 5 and 6, except where specifically noted below. As a non-limiting example, the differential assembly 1000 is a front axle differential, a rear axle differential, an inter-axle differential, a forward tandem axle differential or a rear tandem axle differential.

The differential assembly 1000 has a first differential side gear 1002 and a second differential side gear 1004. As illustrated in FIGS. 7 and 8 of the disclosure, the second differential side gear 1004 has an inner surface 1006 and an outer surface 1008. Circumferentially extending from at least a portion of the outer surface 1008 of the second differential side gear 1004 is a plurality of gear teeth 1010 that are complementary to and meshingly engaged with the plurality of gear teeth 454 on the outer surface 452 of the one or more differential pinion gears 450. As a non-limiting example, the plurality of gear teeth 1010 on the outer surface 1008 of the second differential side gear 1004 are a plurality of hypoid gear teeth, spiral bevel gear teeth, helical gear teeth, spur gear teeth, double hypoid gear teeth, double spiral bevel gear teeth or double helical gear teeth.

Integrally connected to at least a portion of the inner surface 1006 of the second differential side gear 1004 is a second differential output shaft 1012 having a first end portion 1014, a second end portion 1016 and an outer surface 1018. As illustrated in FIGS. 7 and 8 of the disclosure, at least a portion of the first end portion 1014 of the second differential output shaft 1012 is integrally connected to at least a portion of the inner surface 1006 of the second differential side gear 1004. According to an embodiment of the disclosure and as a non-limiting example, the second differential output shaft 1012 is integrally formed as part of the second differential side gear 1004. In accordance with an alternative embodiment of the disclosure and as a non-limiting example, at least a portion of the first end portion 1014 of the second differential output shaft 1012 is integrally connected to the second differential side gear 1004 by using a splined connection, a threaded connection, one or more snap rings, one or more mechanical fasteners, one or more welds and/or any other method of connecting a gear to a rotatable shaft. Additionally, according to yet another embodiment of the disclosure, the second differential output shaft 1012 may be a coupling shaft, a stub shaft or a first axle half shaft.

As illustrated in FIGS. 7 and 8 of the disclosure, the differential assembly 1000 includes a differential case 422 having a first end portion 490, a large diameter intermediate portion 421 and a second end portion 608. The second end portion 608 of the differential case 422, axially outboard from and adjacent to the second end 436 of the large diameter intermediate portion of the differential case 422 is a first reduced diameter portion 1020 having an inner surface 1022 and an outer surface 1024. As illustrated in FIGS. 7 and 8 of the disclosure, the first reduced diameter portion 1020 of the second end portion 608 of the differential case 422 is substantially cylindrical in shape and extends co-axially with at least a portion of the second differential output shaft 1012 of the differential assembly 1000.

Connecting the second end 436 of the large diameter intermediate portion 421 of the differential case 422 to the first reduced diameter portion 1020 of the second end portion 608 of the differential case 422 is a second radially extending wall 1026. As illustrated in FIGS. 7 and 8 of the disclosure, the second radially extending wall 1026 of the differential case 422 is substantially perpendicular to the large diameter intermediate portion 421 and the first reduced diameter portion 1020 second end portion 608 of the differential case 422. According to this embodiment of the disclosure, the second radially extending wall 1026 of the differential case 422 does not include the one or more openings 626 illustrated in FIGS. 5 and 6 of the disclosure.

As illustrated in FIGS. 7 and 8 of the disclosure, the first differential side gear 1002 of the differential assembly 1000 has an inner surface 1028 and an outer surface 1030. Circumferentially extending from at least a portion of the outer surface 1030 of the first differential side gear 1002 is a plurality of gear teeth 1032 that are complementary to and meshingly engaged with the plurality of gear teeth 454 on the outer surface 452 of the one or more differential pinion gears 450. As a non-limiting example, the plurality of gear teeth 1032 on the outer surface 1030 of the first differential side gear 1002 are a plurality of hypoid gear teeth, spiral bevel gear teeth, helical gear teeth, spur gear teeth, double hypoid gear teeth, double spiral bevel gear teeth or double helical gear teeth.

Integrally connected to at least a portion of the inner surface 1028 of the first differential side gear 1002 is a first differential output shaft 1034 having a first end portion 1036, a second end portion 1038 and an outer surface 1040. As illustrated in FIGS. 7 and 8 of the disclosure, at least a portion of the second end portion 1038 of the first differential output shaft 1034 is integrally connected to at least a portion of the inner surface 1028 of the first differential side gear 1002. According to an embodiment of the disclosure and as a non-limiting example, the first differential output shaft 1034 is integrally formed as part of the first differential side gear 1002. In accordance with an alternative embodiment of the disclosure and as a non-limiting example, at least a portion of the second end portion 1038 of the first differential output shaft 1034 is integrally connected to the first differential side gear 1002 by using a splined connection, a threaded connection, one or more snap rings, one or more mechanical fasteners, one or more welds and/or any other method of connecting a gear to a rotatable shaft. Additionally, according to yet another embodiment of the disclosure, the first differential output shaft 1034 may be a coupling shaft or a stub shaft.

Drivingly connecting the clutch can 474 to the first differential output shaft 1034 is the radially extending portion 484 having a first end portion 486 and a second end portion 488. As illustrated in FIGS. 7 and 8 of the disclosure, the radially extending portion 484 extends radially inboard from the clutch can 474 to the first differential output shaft 1034 of the differential assembly 1000. At least a portion of the second end portion 488 of the radially extending portion 484 is integrally connected to at least a portion of the outer surface 1040 of the second end portion 1038 of the first differential output shaft 1034. According to an embodiment of the disclosure and as a non-limiting example, the radially extending portion 484 is integrally formed as part of the second end portion 1038 of the first differential output shaft 1034. In accordance with an alternative embodiment of the disclosure and as a non-limiting example, the radially extending portion 484 is connected to the second end portion 1038 of the first differential output shaft 1034 by using a splined connection, a threaded connection, one or more snap rings, one or more mechanical fasteners, one or more welds and/or any other method of connecting the two components together.

The first end portion 1036 of the first differential output shaft 1034 includes a hollow portion 1042. As illustrated in FIGS. 7 and 8 and the disclosure, the hollow portion 1042 in the first end portion 1036 of the first differential output shaft 1034 extends axially inboard toward the first differential side gear 1002 of the differential assembly 1000.

Circumferentially extending from at least a portion of the outer surface 1040 of the first end portion 1036 of the first differential output shaft 1034 is a plurality of splines 1044. The plurality of splines 1044 extend axially along the outer surface 1040 of the first end portion 1036 of the first differential output shaft 1034.

Axially outboard from the first differential output shaft 1034 is a shaft 1046 having a first end portion 1048, a second end portion 1050 and an outer surface 1052. The shaft 1046 extends co-axially with the first differential output shaft 1034 of the differential assembly 1000. As illustrated in FIGS. 7 and 8 of the disclosure, at least a portion of the second end portion 1050 of the shaft 1046 is disposed within the hollow portion 1042 on the first end portion 1036 of the first differential output shaft 1034. According to an embodiment of the disclosure, at least a portion of the second end portion 1048 of the shaft 1046 is received within a bearing (not shown) that is disposed within the hollow portion 1042 of the first end portion 1036 of the first differential output shaft 1034.

According to an alternative embodiment of the disclosure, the second end portion 1050 of the shaft 1046 has a reduced diameter portion (not shown). In accordance with this embodiment of the disclosure, at least a portion of the reduced diameter portion (not shown) on the second end portion 1050 of the shaft 1046 is disposed within the hollow portion 1042 in the first end portion 1036 of the first differential output shaft 1034. In accordance with yet another embodiment of the disclosure, at least a portion of the reduced diameter portion (not shown) of the second end portion 1050 of the shaft 1046 is received within a bearing (not shown) that is disposed within the hollow portion 1042 of the first end portion 1036 of the first differential output shaft 1034.

It is within the scope of this disclosure that the first end portion 1036 of the first differential output shaft 1034 may be rotationally connected to the shaft 1052 by any conventional means of rotationally connecting two shafts. According to yet another embodiment of the disclosure (not shown), the second end portion of the shaft has a hollow portion that is of a size and shape to receive at least a portion of the first end portion of the first differential output shaft. In accordance with this embodiment of the disclosure (not shown), the first end portion of the first differential output shaft includes a reduced diameter portion that is receivable within a bearing that is disposed within the hollow portion of the second end portion of the shaft.

Circumferentially extending from at least a portion of the outer surface 1052 of the second end portion 1050 of the shaft 1046 is a plurality of splines 1044. The plurality of splines 1054 extend axially along the outer surface 1040 of the second end portion 1050 of the shaft 1046.

Disposed radially outboard from the first end portion 1036 of the first differential output shaft 1034 and the second end portion 1050 of the shaft 1046 is a sliding collar 1056 having an inner surface 1058 and an outer surface 1060. As illustrated in FIGS. 7 and 8 of the disclosure, the sliding collar 1056 extends co-axially with the first differential output shaft 1034 and the shaft 1046 of the differential assembly 1000. Circumferentially extending from the inner surface 1058 of the sliding collar 1056 is a plurality of splines 1062 that are complementary to and meshingly engaged with the plurality of splines 1054 on the outer surface 1052 of the second end portion 1050 of the shaft 1046. Additionally, the plurality of splines 1062 on the inner surface 1058 of the sliding collar 1056 are complementary to and selectively engageable with the plurality of splines 1044 on the outer surface 1040 of the first end portion 1036 of the first differential output shaft 1034.

In order to selectively engage the sliding collar 1056 with the plurality of splines 1044 on the outer surface 1040 of the first end portion 1036 of the first differential output shaft 1034 an actuation mechanism 1064 is used. As a non-limiting example, the actuation mechanism 1064 is a pneumatic actuator, a hydraulic actuator or an electromagnetic actuator.

Integrally connected to an end of the actuation mechanism 1064 is an actuation shaft 1066. An end of the actuation shaft 1066 opposite the actuation mechanism 1064 is a shift fork 1068 having a first end portion 1070 and a second end portion 1072. As illustrated in FIGS. 7 and 8 of the disclosure, the end of the actuation shaft 1066 opposite the actuation mechanism 1064 is integrally connected to at least a portion of the first end portion 1070 of the shift fork 1068. The shift fork 1068 extends radially inboard from the actuation shaft 1066 of the actuation mechanism 1064 toward the sliding collar 1056. According to an embodiment of the disclosure, at least a portion of the second end portion 1072 of the shift fork 1068 is disposed within a channel 1074 circumferentially extending along at least a portion the outer surface 1060 of the sliding collar 1056. As a result, the shift fork 1068 is rotationally and drivingly connecting to the sliding collar 1056.

In operation, the actuation mechanism 1064 applies a force onto an end of the actuation shaft 1066 which applies a force onto the shift fork 1068 which in turn drives sliding collar 1056 from a first position 1076 illustrated in FIG. 8 to a second position 1078 illustrated in FIG. 7 of the disclosure. When in the first position 1076 illustrated in FIG. 8 of the disclosure, the plurality of splines 1062 on the inner surface 1058 of the sliding collar 1056 are meshingly engaged with the plurality of splines 1054 on the outer surface 1052 of the second end portion 1050 of the shaft 1046. Additionally, when in the first position 1076, the plurality of splines 1062 on the inner surface 1058 of the sliding collar 1056 are not meshingly engaged with the plurality of splines 1044 on the outer surface 1040 of the first end portion 1036 of the first differential output shaft 1034. As a result, when the sliding collar 1056 is in the first position 1076 illustrated in FIG. 8 of the disclosure, the shaft 1046 is disconnected from the differential assembly 1000.

When the sliding collar 1056 is in the second position 1078 illustrated in FIG. 7 of the disclosure, the plurality of splines 1062 on the inner surface 1058 of the sliding collar 1056 are meshingly engaged with the plurality of splines 1054 on the outer surface 1052 of the second end portion 1050 of the shaft 1046. Additionally, when in the second position 1078, the plurality of splines 1062 on the inner surface 1058 of the sliding collar 1056 are meshingly engaged with the plurality of splines 1044 on the outer surface 1040 of the first end portion 1036 of the first differential output shaft 1034. As a result, when the sliding collar 1056 is in the second position 1078 illustrated in FIG. 7 of the disclosure, the shaft 1046 is drivingly connected to the differential assembly 1000. The sliding collar 1056 is therefore selectively engageable with the first differential output shaft 1034, allowing the shaft 1046 to be selectively connected and disconnected from the differential assembly 1000.

According to an alternative embodiment of the disclosure (not shown), when the sliding collar is in a first position, the plurality of splines on the inner surface of the sliding collar are meshingly engaged with the plurality of splines on the outer surface of the first end portion of the first differential output shaft. Additionally, according to this embodiment of the disclosure (not shown), when the sliding collar is in the first position, the plurality of splines on the inner surface of the sliding collar are not meshingly engaged with the plurality of splines on the outer surface of the second end portion of the shaft. As a result, when the sliding collar is in the first position, the shaft is disconnected from the differential assembly.

In accordance with this embodiment of the disclosure (not shown), when the sliding collar is in a second position, the plurality of splines on the inner surface of the sliding collar are meshingly engaged with the plurality of splines on the outer surface of the first end portion of the first differential output shaft. Additionally, in accordance with this embodiment of the disclosure (not shown), when the sliding collar is in the second position, the plurality of splines on the inner surface of the sliding collar are meshingly engaged with the plurality of splines on the outer surface of the second end portion of the shaft. As a result, when the sliding collar is in the second position, the shaft is drivingly connected to the differential assembly. In accordance with this embodiment of the disclosure (not shown), the sliding collar is selectively engageable with the shaft, allowing the shaft to be selectively disconnected from the differential assembly.

Figure 9:
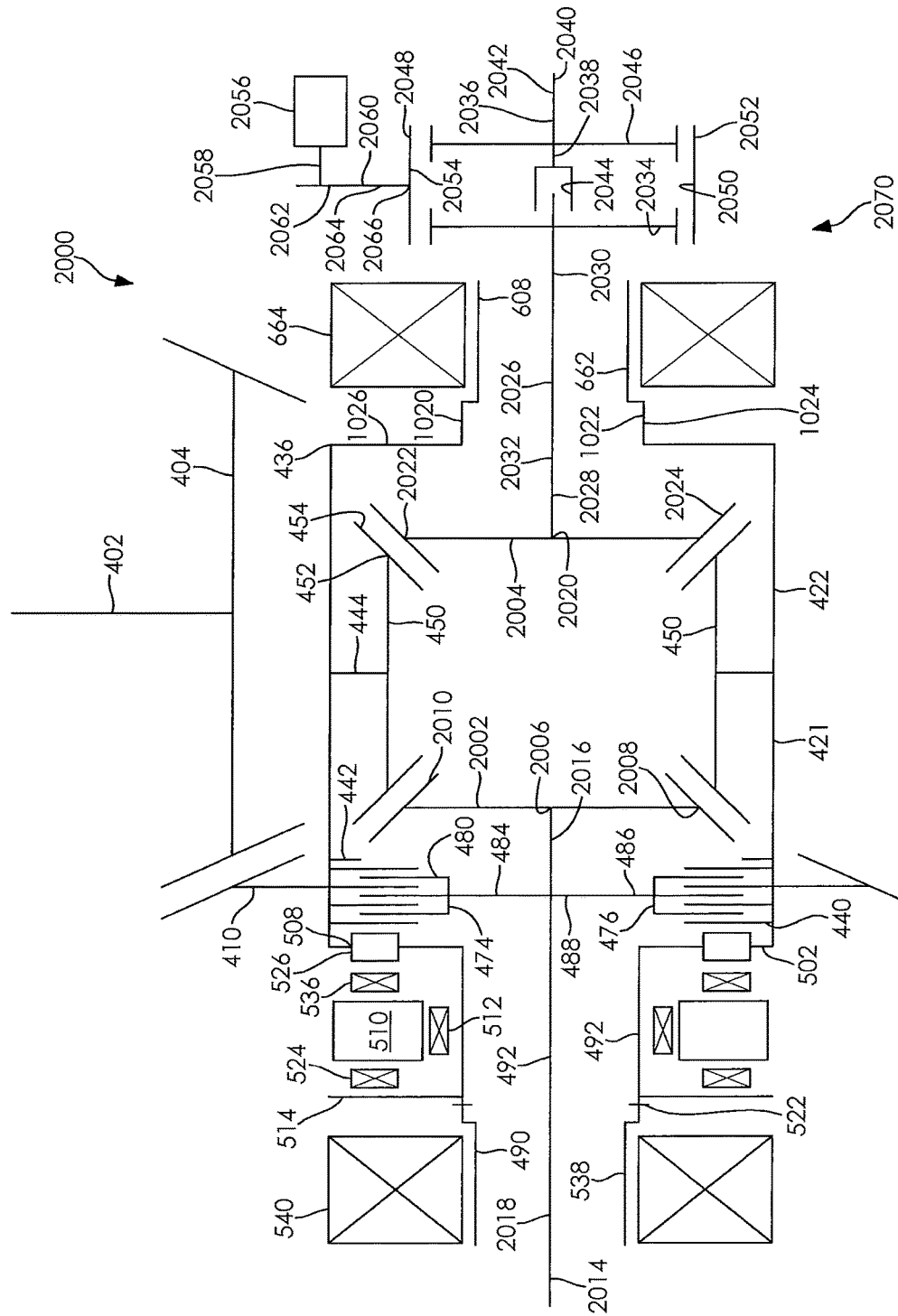
FIG. 9 is a schematic top-plan view of a differential assembly according to yet another embodiment of the disclosure where an axle disconnect system is in a second position.
Figure 10:
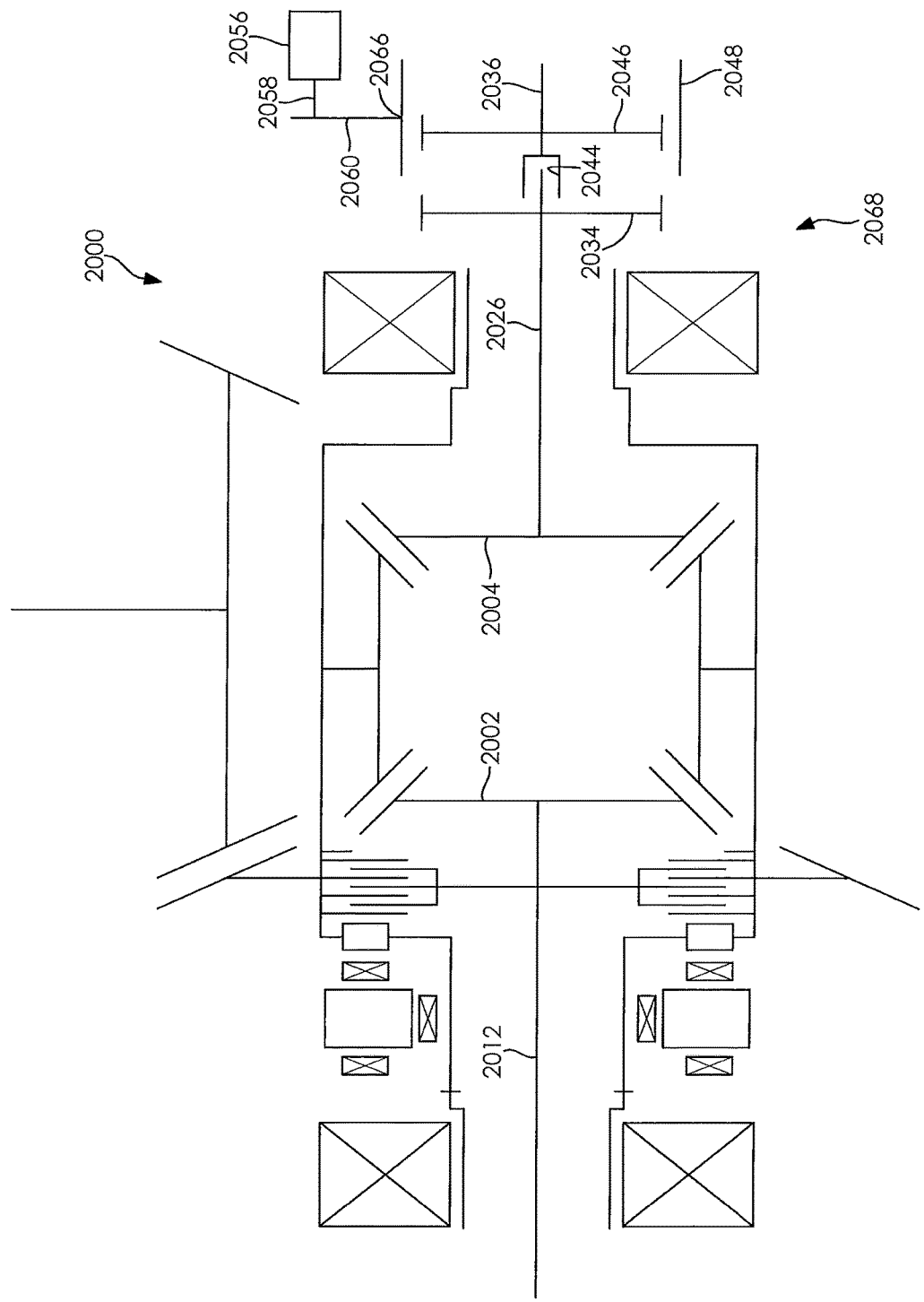
FIG. 10 is a schematic top-plan view of a differential assembly illustrated in FIG. 9 of the disclosure where an axle disconnect system is in a first position.

FIGS. 9 and 10 are a schematic top-plan view of a differential assembly 2000 according to yet another embodiment of the disclosure. The differential assembly 2000 illustrated in FIGS. 9 and 10 of the disclosure are the same as the differential assemblies 400 and 1000 illustrated in FIGS. 5-8, except where specifically noted below. As a non-limiting example, the differential assembly 2000 is a front axle differential, a rear axle differential, an inter-axle differential, a forward tandem axle differential or a rear tandem axle differential.

The differential assembly 2000 has a first differential side gear 2002 and a second differential side gear 2004. As illustrated in FIGS. 9 and 10 of the disclosure, the first differential side gear 2002 has an inner surface 2006 and an outer surface 2008. Circumferentially extending from at least a portion of the outer surface 2008 of the first differential side gear 2002 is a plurality of gear teeth 2010 that are complementary to and meshingly engaged with the plurality of gear teeth 454 on the outer surface 452 of the one or more differential pinion gears 450. As a non-limiting example, the plurality of gear teeth 2012 on the outer surface 2008 of the first differential side gear 2002 are a plurality of hypoid gear teeth, spiral bevel gear teeth, helical gear teeth, spur gear teeth, double hypoid gear teeth, double spiral bevel gear teeth or double helical gear teeth.

Integrally connected to at least a portion of the inner surface 2006 of the first differential side gear 2002 is a first differential output shaft 2012 having a first end portion 2014, a second end portion 2016 and an outer surface 2018. As illustrated in FIGS. 9 and 10 of the disclosure, at least a portion of the second end portion 2016 of the first differential output shaft 2012 is integrally connected to at least a portion of the inner surface 2006 of the first differential side gear 2002. According to an embodiment of the disclosure and as a non-limiting example, the first differential output shaft 2012 is integrally formed as part of the first differential side gear 2002. In accordance with an alternative embodiment of the disclosure and as a non-limiting example, at least a portion of the second end portion 2016 of the first differential output shaft 2012 is integrally connected to the first differential side gear 2002 by using a splined connection, a threaded connection, one or more snap rings, one or more mechanical fasteners, one or more welds and/or any other method of connecting a gear to a rotatable shaft. Additionally, according to yet another embodiment of the disclosure, the first differential output shaft 2012 may be a coupling shaft, a stub shaft or a first axle half shaft.

Drivingly connecting the clutch can 474 to the first differential output shaft 2012 is the radially extending portion 484 having a first end portion 486 and a second end portion 488. As illustrated in FIGS. 9 and 10 of the disclosure, the radially extending portion 484 extends radially inboard from the clutch can 474 to the first differential output shaft 2012 of the differential assembly 2000. At least a portion of the second end portion 488 of the radially extending portion 484 is integrally connected to at least a portion of the outer surface 2018 of the second end portion 2016 of the first differential output shaft 2012. According to an embodiment of the disclosure and as a non-limiting example, the radially extending portion 484 is integrally formed as part of the second end portion 2016 of the first differential output shaft 2012. In accordance with an alternative embodiment of the disclosure and as a non-limiting example, the radially extending portion 484 is connected to the second end portion 2016 of the first differential output shaft 2012 by using a splined connection, a threaded connection, one or more snap rings, one or more mechanical fasteners, one or more welds and/or any other method of connecting the two components together.

As illustrated in FIGS. 9 and 10 of the disclosure, the second differential side gear 2004 of the differential assembly 2000 has an inner surface 2020 and an outer surface 2022. Circumferentially extending from at least a portion of the outer surface 2022 of the second differential side gear 2004 is a plurality of gear teeth 2024 that are complementary to and meshingly engaged with the plurality of gear teeth 454 on the outer surface 452 of the one or more differential pinion gears 450. As a non-limiting example, the plurality of gear teeth 2024 on the outer surface 2022 of the second differential side gear 2004 are a plurality of hypoid gear teeth, spiral bevel gear teeth, helical gear teeth, spur gear teeth, double hypoid gear teeth, double spiral bevel gear teeth or double helical gear teeth.

Integrally connected to at least a portion of the inner surface 2020 of the second differential side gear 2004 is a second differential output shaft 2026 having a first end portion 2028, a second end portion 2030 and an outer surface 2032. As illustrated in FIGS. 9 and 10 of the disclosure, at least a portion of the first end portion 2028 of the second differential output shaft 2026 is integrally connected to at least a portion of the inner surface 2020 of the second differential side gear 2004. According to an embodiment of the disclosure and as a non-limiting example, the second differential output shaft 2026 is integrally formed as part of the second differential side gear 2004. In accordance with an alternative embodiment of the disclosure and as a non-limiting example, at least a portion of the first end portion 2028 of the second differential output shaft 2026 is integrally connected to the second differential side gear 2004 by using a splined connection, a threaded connection, one or more snap rings, one or more mechanical fasteners, one or more welds and/or any other method of connecting a gear to a rotatable shaft. Additionally, according to yet another embodiment of the disclosure, the second differential output shaft 2026 may be a coupling shaft or a stub shaft.

Circumferentially extending from at least a portion of the outer surface 2032 of the second end portion 2030 of the second differential output shaft 2026 is a plurality of splines 2034. The plurality of splines 2034 extend axially along the outer surface 2032 of the second end portion 2030 of the second differential output shaft 2026.

Axially outboard from the second differential output shaft 2026 is a shaft 2036 having a first end portion 2038, a second end portion 2040 and an outer surface 2042. The shaft 2036 extends co-axially with the second differential output shaft 2026 of the differential assembly 2000. As illustrated in FIGS. 9 and 10 of the disclosure, at least a portion of the second end portion 2030 of the second differential output shaft 2026 is disposed within a hollow portion 2044 in the first end portion 2038 of the shaft 2036. According to an embodiment of the disclosure, at least a portion of the second end portion 2030 of the second differential output shaft 2026 is received within a bearing (not shown) that is disposed within the hollow portion 2044 of the first end portion 2038 of the shaft 2036.

According to an alternative embodiment of the disclosure, the second end portion 2030 of the second differential output shaft 2026 has a reduced diameter portion (not shown). In accordance with this embodiment of the disclosure, at least a portion of the reduced diameter portion (not shown) on the second end portion 2030 of the second differential output shaft 2026 is disposed within the hollow portion 2044 in the first end portion 2038 of the shaft 2036. In accordance with yet another embodiment of the disclosure, at least a portion of the reduced diameter portion (not shown) of the second end portion 2030 of the second differential output shaft 2026 is received within a bearing (not shown) that is disposed within the hollow portion 2044 of the first end portion 2038 of the shaft 2036.

It is within the scope of this disclosure that the second end portion 2030 of the second differential output shaft 2026 may be rotationally connected to the shaft 2036 by any conventional means of rotationally connecting two shafts. According to yet another embodiment of the disclosure (not shown), the second end portion of the second differential output shaft has a hollow portion that is of a size and shape to receive at least a portion of the first end portion of the shaft. In accordance with this embodiment of the disclosure (not shown), the first end portion of the shaft includes a reduced diameter portion that is receivable within a bearing that is disposed within the hollow portion of the second end portion of the second differential output shaft.

Circumferentially extending from at least a portion of the outer surface 2042 of the first end portion 2038 of the shaft 2036 is a plurality of splines 2046. The plurality of splines 2046 extend axially along the outer surface 2042 of the first end portion 2038 of the shaft 2036.

Disposed radially outboard from the second end portion 2030 of the second differential output shaft 2026 and the first end portion 2038 of the shaft 2036 is a sliding collar 2048 having an inner surface 2050 and an outer surface 2052. As illustrated in FIGS. 9 and 10 of the disclosure, the sliding collar 2048 extends co-axially with the second differential output shaft 2026 and the shaft 2036 of the differential assembly 2000. Circumferentially extending from the inner surface 2050 of the sliding collar 2048 is a plurality of splines 2054 that are complementary to and meshingly engaged with the plurality of splines 2046 on the outer surface 2042 of the first end portion 2038 of the shaft 2036. Additionally, the plurality of splines 2054 on the inner surface 2050 of the sliding collar 2048 are complementary to and selectively engageable with the plurality of splines 2034 on the outer surface 2032 of the second end portion 2030 of the second differential output shaft 2026.

In order to selectively engage the sliding collar 2048 with the plurality of splines 2034 on the outer surface 2032 of the second end portion 2030 of the second differential output shaft 2026 an actuation mechanism 2056 is used. As a non-limiting example, the actuation mechanism 2056 is a pneumatic actuator, a hydraulic actuator or an electromagnetic actuator.

Integrally connected to an end of the actuation mechanism 2056 is an actuation shaft 2058. An end of the actuation shaft 2058 opposite the actuation mechanism 2056 is a shift fork 2060 having a first end portion 2062 and a second end portion 2064. As illustrated in FIGS. 9 and 10 of the disclosure, the end of the actuation shaft 2058 opposite the actuation mechanism 2056 is integrally connected to at least a portion of the first end portion 2062 of the shift fork 2060. The shift fork 2060 extends radially inboard from the actuation shaft 2058 of the actuation mechanism 2056 toward the sliding collar 2048. According to an embodiment of the disclosure, at least a portion of the second end portion 2064 of the shift fork 2060 is disposed within a channel 2066 circumferentially extending along at least a portion the outer surface 2052 of the sliding collar 2048. As a result, the shift fork 2060 is rotationally and drivingly connecting to the sliding collar 2048.

In operation, the actuation mechanism 2056 applies a force onto an end of the actuation shaft 2058 which applies a force onto the shift fork 2060 which in turn drives sliding collar 2048 from a first position 2068 illustrated in FIG. 10 to a second position 2070 illustrated in FIG. 9 of the disclosure. When in the first position 2068 illustrated in FIG. 10 of the disclosure, the plurality of splines 2054 on the inner surface 2050 of the sliding collar 2048 are meshingly engaged with the plurality of splines 2046 on the outer surface 2042 of the first end portion 2038 of the shaft 2036. Additionally, when in the first position 2068, the plurality of splines 2054 on the inner surface 2050 of the sliding collar 2048 are not meshingly engaged with the plurality of splines 2034 on the outer surface 2032 of the second end portion 2030 of the second differential output shaft 2026. As a result, when the sliding collar 2046 is in the first position 2068 illustrated in FIG. 10 of the disclosure, the shaft 2036 is disconnected from the differential assembly 2000.

When the sliding collar 2048 is in the second position 2070 illustrated in FIG. 9 of the disclosure, the plurality of splines 2054 on the inner surface 2050 of the sliding collar 2048 are meshingly engaged with the plurality of splines 2046 on the outer surface 2042 of the first end portion 2038 of the shaft 2036. Additionally, when in the second position 2070, the plurality of splines 2054 on the inner surface 2050 of the sliding collar 2048 are meshingly engaged with the plurality of splines 2034 on the outer surface 2032 of the second end portion 2030 of the second differential output shaft 2026. As a result, when the sliding collar 2048 is in the second position 2070 illustrated in FIG. 7 of the disclosure, the shaft 2036 is drivingly connected to the differential assembly 2000. The sliding collar 2048 is therefore selectively engageable with the second differential output shaft 2026, allowing the shaft 2036 to be selectively connected and disconnected from the differential assembly 2000.

According to an alternative embodiment of the disclosure (not shown), when the sliding collar is in a first position, the plurality of splines on the inner surface of the sliding collar are meshingly engaged with the plurality of splines on the outer surface of the second end portion of the second differential output shaft. Additionally, according to this embodiment of the disclosure (not shown), when the sliding collar is in the first position, the plurality of splines on the inner surface of the sliding collar are not meshingly engaged with the plurality of splines on the outer surface of the first end portion of the shaft. As a result, when the sliding collar is in the first position, the shaft is disconnected from the differential assembly.

In accordance with this embodiment of the disclosure (not shown), when the sliding collar is in a second position, the plurality of splines on the inner surface of the sliding collar are meshingly engaged with the plurality of splines on the outer surface of the second end portion of the second differential output shaft. Additionally, in accordance with this embodiment of the disclosure (not shown), when the sliding collar is in the second position, the plurality of splines on the inner surface of the sliding collar are meshingly engaged with the plurality of splines on the outer surface of the first end portion of the shaft. As a result, when the sliding collar is in the second position, the shaft is drivingly connected to the differential assembly. In accordance with this embodiment of the disclosure (not shown), the sliding collar is selectively engageable with the shaft, allowing the shaft to be selectively disconnected from the differential assembly.

Figure 11:
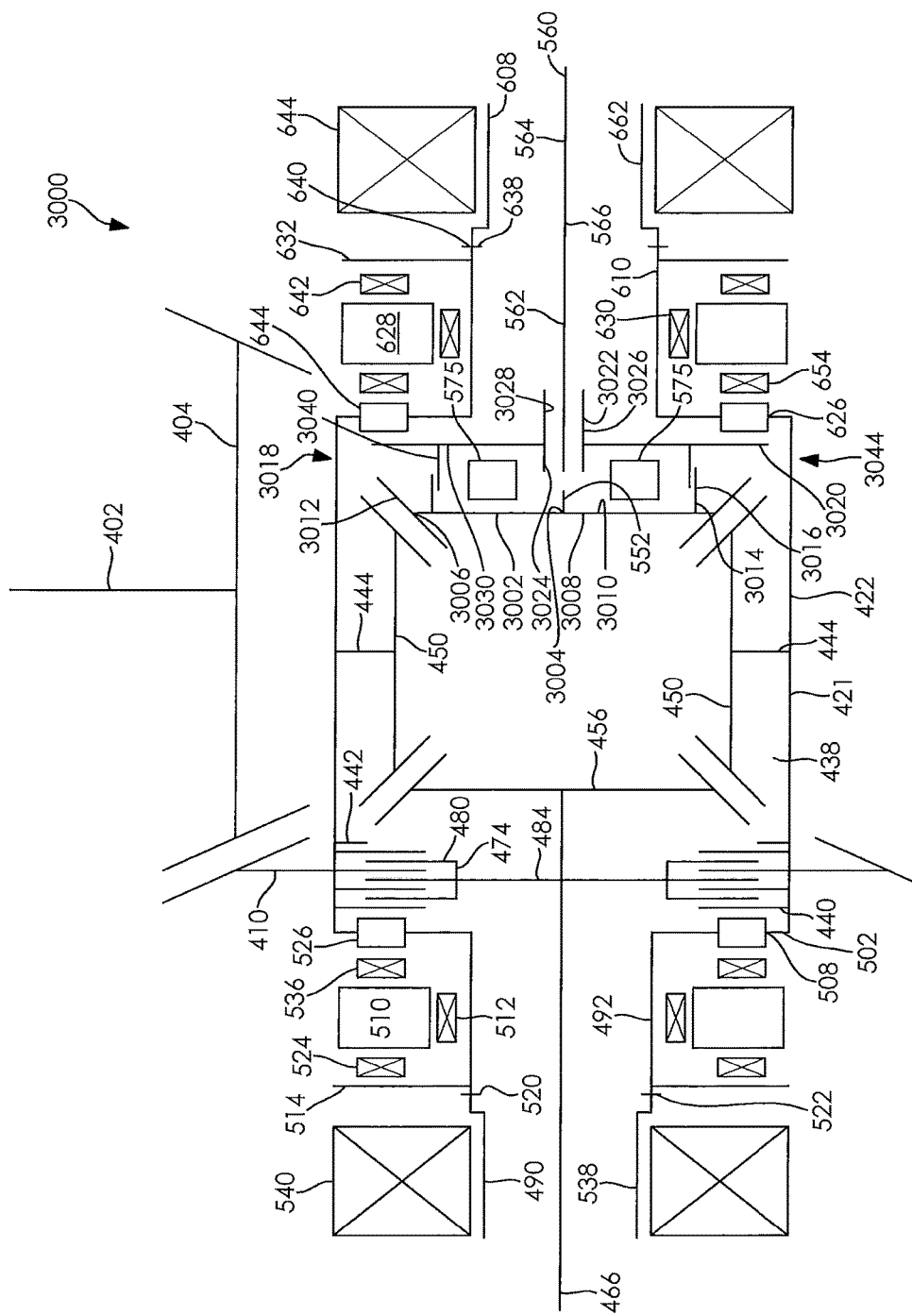
FIG. 11 is a schematic top-plan view of a differential assembly according to still another embodiment of the disclosure where the axle disconnect system is in a second position.
Figure 12:
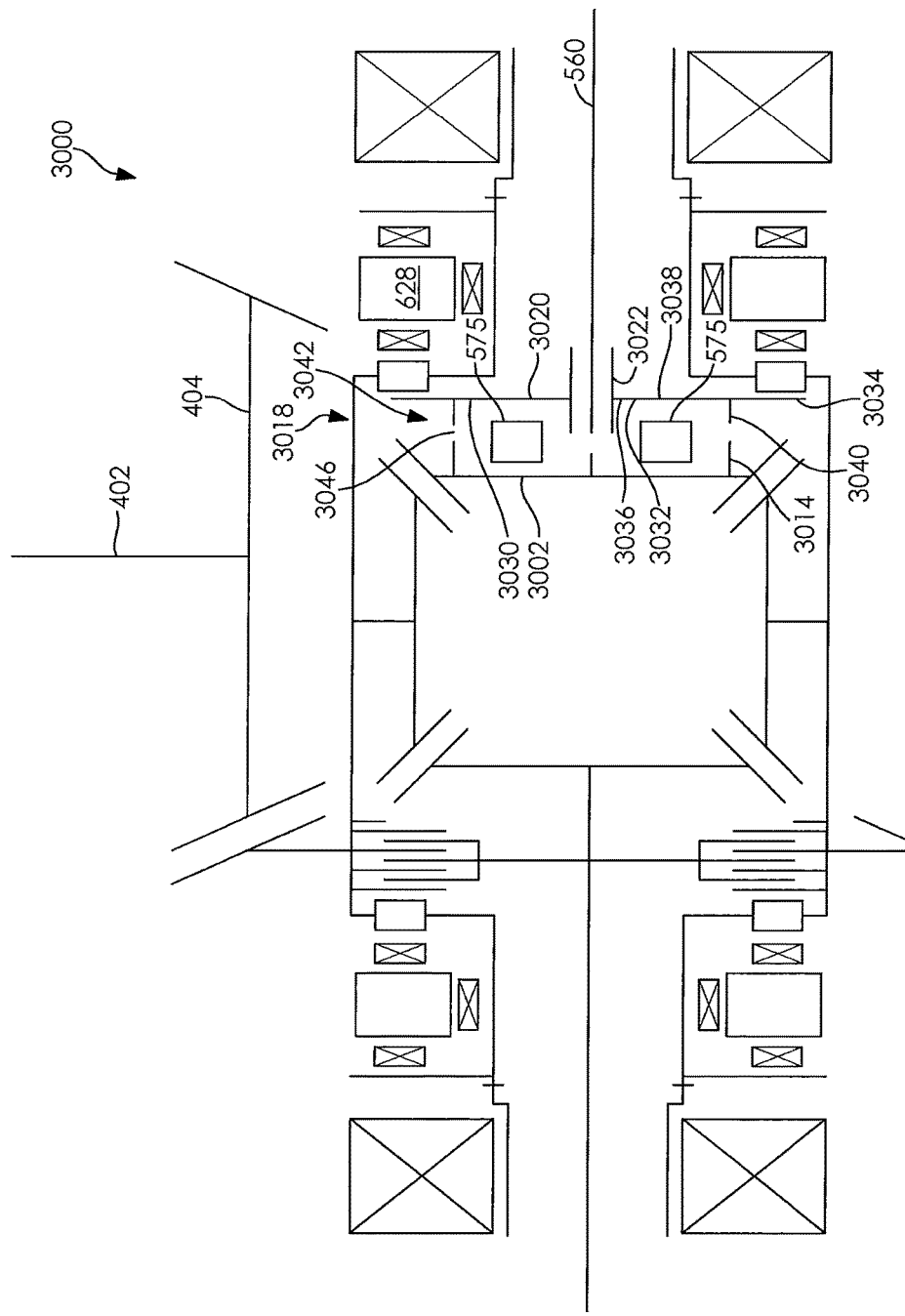
FIG. 12 is schematic top-plan view of the differential assembly illustrated in FIG. 11 of the disclosure where the axle disconnect system is in a first position.

FIGS. 11 and 12 are a schematic top plan view of a differential assembly 3000 according to still another embodiment of the disclosure. The differential assembly illustrated in FIGS. 11 and 12 are the same as the differential assembly 400 illustrated in FIGS. 5 and 6, except where specifically noted below. As a non-limiting example, the differential assembly 3000 is a front axle differential, a rear axle differential, an inter-axle differential, a forward tandem axle differential or a rear tandem axle differential.

The differential assembly 3000 has a first differential side gear 456 and a second differential side gear 3002. As illustrated in FIGS. 11 and 12 of the disclosure, the second differential side gear 3002 has an inner surface 3004, an outer surface 3006, an axially inboard side 3008 and an axially outboard side 3010. Circumferentially extending from at least a portion of the outer surface 3006 of the second differential side gear 3002 is a plurality of gear teeth 3012 that are complementary to and meshingly engaged with the plurality of gear teeth 454 on the outer surface 452 of the one or more differential pinion gears 450. As a non-limiting example, the plurality of gear teeth 3012 on the outer surface 3006 of the second differential side gear 3002 are a plurality of hypoid gear teeth, spiral bevel gear teeth, helical gear teeth, spur gear teeth, double hypoid gear teeth, double spiral bevel gear teeth or double helical gear teeth.

Integrally connected to at least a portion of the inner surface 3004 of the second differential side gear 3002 is the first end portion 554 of the stub shaft 552. According to an embodiment of the disclosure and as a non-limiting example, the stub shaft 552 is integrally formed as part of the second differential side gear 3002. In accordance with an alternative embodiment of the disclosure and as a non-limiting example, at least a portion of the first end portion 554 of the stub shaft 554 is integrally connected to the second differential side gear 3002 by using a splined connection, a threaded connection, one or more snap rings, one or more mechanical fasteners, one or more welds and/or any other method of connecting a gear to a rotatable shaft.

Circumferentially extending from at least a portion of the axially outboard side 3010 of the second differential side gear 3002 is a plurality of clutch teeth 3014. As a non-limiting example, the plurality of clutch teeth 3014 on the axially outboard side 3010 of the second differential side gear 3002 are a plurality of dog clutch teeth. The plurality of clutch teeth 3014 form a first portion 3016 of a clutching assembly 3018. As a non-limiting example, the clutching assembly 3018 is an axial dog clutch assembly.

Axially outboard from the first portion 3016 of the clutching assembly 3018 is a second portion 3020 of the clutching assembly 3018. As illustrated in FIGS. 11 and 12 of the disclosure, the first portion 3016 and the second portion 3020 of the clutching assembly 3018 are disposed within the hollow portion 438 of the large diameter intermediate portion 421 of the differential case 422.

The second portion 3020 of the clutching assembly 3018 includes a sliding collar 3022 having an inner surface 3024 and an outer surface 3026. As illustrated in FIGS. 11 and 12 of the disclosure, the sliding collar 3022 is substantially cylindrical in shape and extends co-axially with the second differential output shaft 560. Circumferentially extending from at least a portion of the inner surface 3024 of the sliding collar 3022 of the second portion 3023 of the clutching assembly 3028 is a plurality of splines 3028. The plurality of splines 3028 on the inner surface 3024 of the sliding collar 3022 are complementary to and meshingly engaged with the plurality of splines 568 on the outer surface 566 of the first end portion 562 of the second differential output shaft 560. The sliding collar 3022 of the second portion 3022 of the clutching assembly 3018 is therefore able to slide axially along the outer surface 566 of the second differential output shaft 560. As a result, the sliding collar 3022 of the second portion 3020 of the clutching assembly 3018 is slidingly engaged and drivingly engaged with the second differential output shaft 560.

Extending radially outboard from at least a portion of the outer surface 3026 of the sliding collar 3022 of the second portion 3020 of the clutching assembly 3018 is a radially extending wall portion 3030 having a first end portion 3032, a second end portion 3034, an axially inboard side 3036 and an axially outboard side 3038. As illustrated in FIGS. 11 and 12 of the disclosure, the radially extending wall portion 3030 is substantially disc shaped. According to an embodiment of the disclosure, the radially extending wall portion 3030 is integrally formed as part of the outer surface 3026 of the sliding collar 3022 of the second portion 3020 of the clutching assembly 3018. In accordance with an alternative embodiment of the disclosure and as a non-limiting example, the radially extending wall portion 3030 is connected to outer surface 3026 of the sliding collar 3022 of the second portion 3020 of the clutching assembly 3018 by using a splined connection, a threaded connection, one or more snap rings, one or more mechanical fasteners, one or more welds and/or any other method of connecting the two components together.

Circumferentially extending from at least a portion of the axially inboard side 3036 of the radially extending wall portion 3030 of the second portion 3020 of the clutching assembly 3018 is a plurality of clutch teeth 3040. The plurality of clutch teeth 3040 on the axially inboard side 3036 of the radially extending wall portion 3030 of the second portion 3020 of the clutching assembly 3018 are complementary to and selectively engageable with the plurality of clutch teeth 3014 on the axially outboard side 3010 of the second differential side gear 3002. As a non-limiting example, the plurality of clutch teeth 3040 on the axially inboard side 3036 the radially extending wall portion 3030 of the second portion 3020 of the clutching assembly 3018 are a plurality of dog clutch teeth.

In operation, the second clutch actuation mechanism 628 applies a force onto an end of the fourth axial thrust bearing 654 opposite the one or more thrust pins 644 till the one or more thrust pins 644 come into direct contact with the second portion 3020 of the clutching assembly 3018. The second clutch actuation mechanism 628 then moves the second portion 3020 of the clutching assembly 3028 axially from a first position 3042 illustrated in FIG. 12 to a second position 3044 illustrated in FIG. 1 of the disclosure. When in the first position 3042 illustrated in FIG. 12, the plurality of clutch teeth 3040 on the axially inboard side 3036 of the radially extending wall portion 3030 of the second portion 3020 of the clutching assembly 3018 are not meshingly engaged with the plurality of clutch teeth 3014 on said axially outboard side 3010 of the second differential side gear 3002 defining a gap 3046 there between. When in the second position 3044 illustrated in FIG. 11, the plurality of clutch teeth 3040 on the axially inboard side 3036 of the radially extending wall portion 3030 of the second portion 3020 of the clutching assembly 3018 are meshingly engaged with the plurality of clutch teeth 3014 on said axially outboard side 3010 of the second differential side gear 3002. As a result, the second portion 3020 of the clutching assembly 3018 is selectively engageable with the second differential side gear 3002, allowing the second differential output shaft 560 to be selectively connected and disconnected from the differential assembly 3000.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A differential assembly, comprising:
   a differential case having a first end portion, a large diameter intermediate portion and a second end portion;
      wherein said large diameter intermediate portion has a first end portion, second end portion, a first end, second end, an inner surface and an outer surface defining a hollow portion therein;
      wherein a first reduced diameter portion of said first end portion of said differential case is disposed adjacent to and axially outboard from said first end of said large diameter intermediate portion and a first radially extending wall connects said first reduced diameter portion of said first end portion of differential case to said first end of said large diameter intermediate portion of said differential case;
      wherein at least a portion of one or more thrust pins extend through one or more openings extending from an inner surface to an outer surface of said first radially extending wall;
      wherein a first reduced diameter portion of said second end portion of said differential case is disposed adjacent to and axially outboard from said second end of said large diameter intermediate portion and a second radially extending wall connects said first reduced diameter portion to said second end of said large diameter intermediate portion;
      wherein at least a portion of one or more thrust pins extend through one or more openings extending from an inner surface to an outer surface of said second radially extending wall;
   a first differential side gear, a second differential side gear and one or more differential pinion gears disposed within said hollow portion of said large diameter intermediate portion of said differential case;
      wherein said first differential side gear is drivingly connected to a first differential output shaft having a first end portion and a second end portion;
      wherein said second differential side gear is drivingly connected to a first end portion of a stub shaft and a second end portion of said stub shaft is rotationally connected top at least a portion of a first end portion of a second differential output shaft;
   a dog clutch assembly having a first portion and a second portion disposed within said hollow portion of said large diameter intermediate portion of said differential case;
      wherein said first portion of said clutching assembly extends axially outboard from an axially outboard side of said second differential side gear and a plurality of clutch teeth circumferentially extend from an inner surface of said first portion of said clutching assembly;
      wherein said second portion of said clutching assembly is drivingly connected to and slidingly engaged with said first end portion of said second differential output shaft;
      wherein a substantially cylindrical portion extends axially inboard from an axially inboard side of said second portion of said clutching assembly and a plurality of clutch teeth circumferentially extend from an outer surface of said substantially cylindrical portion of said second portion of said clutching assembly;
   a clutch can in driving engagement with said second end portion of said first differential output shaft and is disposed within said hollow portion of said large diameter intermediate portion of said differential case;
   a clutch pack comprising a first and a second plurality of clutch plates;
      wherein said first plurality of clutch plates are drivingly engaged with said inner surface of said first end portion of said large diameter intermediate portion and said second plurality of clutch plates are drivingly engaged with an outer surface of said clutch can;
   a first clutch actuation mechanism disposed radially outboard from said first reduced diameter portion of said first end portion of said differential case;
      wherein said first clutch actuation mechanism drives said one or more thrust pins in said one or more openings of said first radially extending wall in an axial manner to apply a force to said clutch pack causing said first and said second plurality of clutch plates to be at least variably frictionally engaged;
   a second clutch actuation mechanism disposed radially outboard from said first reduced diameter portion of said second end portion of said differential case; and
      wherein said second clutch actuation mechanism drives said one or more thrust pins in said one or more openings of said second radially extending wall in an axial manner to apply a force to said second portion of said clutching assembly to selectively meshingly engage said plurality of clutch teeth on said second portion of said clutching assembly with said plurality of clutch teeth on said first portion of said clutching assembly.

2. The differential assembly of claim 1, wherein said first clutch actuation mechanism is a pneumatic actuator, a hydraulic actuator, an electromagnetic actuator or a ball and ramp actuator; and
   wherein said second clutch actuation mechanism is a pneumatic actuator, a hydraulic actuator, an electromagnetic actuator or a ball and ramp actuator.

3. The differential assembly of claim 1, further comprising a biasing member, wherein said biasing member is disposed between said second differential side gear and said and said second portion of said clutching assembly.

4. The differential assembly of claim 3, wherein said clutching assembly has a first position and a second position;
   wherein in said first position said plurality of clutch teeth on said second portion of said clutching assembly are not meshingly engaged with said plurality of clutch teeth on said first portion of said clutching assembly defining a gap therebetween; and
   wherein in said second position said plurality of clutch teeth on said second portion of said clutching assembly are meshingly engaged with said plurality of clutch teeth on said first portion of said clutching assembly.

5. The differential assembly of claim 1, further comprising a first bearing and a second bearing;
   wherein said first bearing is disposed between said first clutch actuation mechanism and said first reduced diameter portion of said first end portion of said differential case; and
   wherein said second bearing is disposed between said second clutch actuation mechanism and said first reduced diameter portion of said second end portion of said differential case.

6. The differential assembly of claim 1, further comprising a first thrust bearing and a second thrust bearing;
   wherein said first thrust bearing is disposed between said first clutch actuation mechanism and said one or more thrust pins in said one or more openings of said first radially extending wall of said differential case; and
   wherein said second thrust bearing is disposed between said second clutch actuation mechanism and said one or more thrust pins in said one or more openings of said second radially extending wall of said differential case.

7. The differential assembly of claim 6, further comprising a first radially extending thrust wall, a second radially extending thrust wall, a third trust bearing and a fourth thrust bearing;
   wherein said first radially extending thrust wall is integrally connected to and extends radially outboard from an outer surface of said first reduced diameter portion of said first end portion of said differential case;
   wherein said third thrust bearing is disposed between said first clutch actuation mechanism and said first radially extending thrust wall of said first reduced diameter portion of said first end portion of said differential case;
   wherein said second radially extending thrust wall is integrally connected to and extends radially outboard from an outer surface of said first reduced diameter portion of said second end portion of said differential case; and
   wherein said fourth thrust bearing is disposed between said second clutch actuation mechanism and said second radially extending thrust wall of said first reduced diameter portion of said second end portion of said differential case.

8. A differential assembly, comprising:
   a ring gear;
   a differential case having a first end portion, a large diameter intermediate portion and a second end portion;
      wherein said large diameter intermediate portion has a first end portion, second end portion, a first end, second end, an inner surface and an outer surface defining a hollow portion therein;
      wherein a first reduced diameter portion of said first end portion of said differential case is disposed adjacent to and axially outboard from said first end of said large diameter intermediate portion and a first radially extending wall connects said first reduced diameter portion of said first end portion of differential case to said first end of said large diameter intermediate portion of said differential case;
      wherein at least a portion of one or more thrust pins extend through one or more openings extending from an inner surface to an outer surface of said first radially extending wall;
   a first differential side gear, a second differential side gear and one or more differential pinion gears disposed within said hollow portion of said large diameter intermediate portion of said differential case;
      wherein said second differential side gear is drivingly connected to a second differential output shaft;
      wherein said first differential side gear is drivingly connected to a first differential output shaft having a first end portion and a second end portion and an outer surface;
   a clutch can in driving engagement with said second end portion of said first differential output shaft and is disposed within said hollow interior portion of said large diameter intermediate portion of said differential case;
   a clutch pack comprising a first and a second plurality of clutch plates;
      wherein said first plurality of clutch plates are drivingly engaged with said inner surface of said first end portion of said large diameter intermediate portion and said second plurality of clutch plates are drivingly engaged with an outer surface of said clutch can;
      wherein at least a portion of said first and said second plurality of clutch plates are disposed axially outboard from an axially outboard side and axially inboard from an axially inboard side of said differential ring gear;
   a shaft having a second end portion that is rotationally connected said first end portion of said first differential output shaft;
   a first clutch actuation mechanism disposed radially outboard from said first reduced diameter portion of said first end portion of said differential case;
      wherein said first clutch actuation mechanism drives said one or more thrust pins in said one or more openings of said first radially extending wall in an axial manner to apply a force to said clutch pack causing said first and said second plurality of clutch plates to be at least variably frictionally engaged;
   a sliding collar disposed outside said differential case;
      wherein a plurality of splines circumferentially extend from at least a portion of an inner surface of said sliding collar;
      wherein said plurality of splines on said inner surface of said sliding collar are complementary to a plurality of splines circumferentially extending from at least a portion of said outer surface of said first end portion of said first differential output shaft and a plurality of splines circumferentially extending from at least a portion of an outer surface of said second end portion of said shaft;
   a shift fork;

wherein at least a portion of a second end portion of said shift fork is disposed within a channel circumferentially extending along said outer surface of said sliding collar; and an actuation mechanism applies a force onto a first end portion of said shift fork driving said sliding collar from a first position to a second position.

9. The differential assembly of claim 8, wherein said first clutch actuation mechanism is a pneumatic actuator, a hydraulic actuator, an electromagnetic actuator or a ball and ramp actuator.

10. The differential assembly of claim 8, wherein the actuation mechanism is a pneumatic actuator, a hydraulic actuator or an electromagnetic actuator.

11. The differential assembly of claim 8, wherein in said first position said shaft is disconnected from said first differential output shaft; and wherein in said second position said shaft is drivingly connected to said first differential output shaft.

12. The differential assembly of claim 8, further comprising a bearing, wherein said bearing is disposed between said first clutch actuation mechanism and said first reduced diameter portion of said first end portion of said differential case.

13. The differential assembly of claim 8, further comprising a first thrust bearing, wherein said first thrust bearing is disposed between said first clutch actuation mechanism and said one or more thrust pins in said one or more openings of said first radially extending wall of said differential case.

14. The differential assembly of claim 13, further comprising a first radially extending thrust wall and a second thrust bearing;

wherein said first radially extending thrust wall is integrally connected to and extends radially outboard from an outer surface of said first reduced diameter portion of said first end portion of said differential case; and wherein said second thrust bearing is disposed between said first clutch actuation mechanism and said first radially extending thrust wall of said first reduced diameter portion of said first end portion of said differential case.

15. A differential assembly, comprising:

a ring;

a differential case having a first end portion, a large diameter intermediate portion and a second end portion;

wherein said large diameter intermediate portion has a first end portion, second end portion, a first end, second end, an inner surface and an outer surface defining a hollow portion therein;

wherein a first reduced diameter portion of said first end portion of said differential case is disposed adjacent to and axially outboard from said first end of said large diameter intermediate portion and a first radially extending wall connects said first reduced diameter portion of said first end portion of differential case to said first end of said large diameter intermediate portion of said differential case;

wherein at least a portion of one or more thrust pins extend through one or more openings extending from an inner surface to an outer surface of said first radially extending wall;

a first differential side gear, a second differential side gear and one or more differential pinion gears disposed within said hollow portion of said large diameter intermediate portion of said differential case;

wherein said first differential side gear is drivingly connected to a first differential output shaft;

wherein said second differential side gear is drivingly connected to a second differential output shaft having a first end portion, a second end portion and an outer surface;

a clutch can in driving engagement with said second end portion of said first differential output shaft and disposed within said hollow portion of said large diameter intermediate portion of said differential case;

a clutch pack comprising a first and a second plurality of clutch plates;

wherein said first plurality of clutch plates are drivingly engaged with said inner surface of said first end portion of said large diameter intermediate portion of said differential case and said second plurality of clutch plates are drivingly engaged with an outer surface of said clutch can;

wherein at least a portion of said first and said second plurality of clutch plates are disposed axially outboard from an axially outboard side of and axially inboard from an axially inboard side of said differential ring gear;

a shaft having first end portion that is rotatively connected to said second end portion of said second differential output shaft;

a first clutch actuation mechanism disposed radially outboard from said first reduced diameter portion of said first end portion of said differential case;

wherein said first clutch actuation mechanism drives said one or more thrust pins in said one or more openings of said first radially extending wall in an axial manner to apply a force to said clutch pack causing said first and said second plurality of clutch plates to be at least variably frictionally engaged;

a sliding collar disposed outside said differential case;

wherein a plurality of splines circumferentially extend from at least a portion of an inner surface of said sliding collar;

wherein said plurality of splines on said inner surface of said sliding collar are complementary to a plurality of splines circumferentially extending from at least a portion of said outer surface of said second end portion of said second differential output shaft and said plurality of splines circumferentially extending from at least a portion of an outer surface of said first end portion of said shaft;

a shift fork;

wherein at least a portion of a second end portion of said shift fork is disposed within a channel circumferentially extending along said outer surface of said sliding collar; and an actuation mechanism applies a force onto a first end portion of said shift fork driving said sliding collar from a first position to a second position.

16. The differential assembly of claim 15, wherein said first clutch actuation mechanism is a pneumatic actuator, a hydraulic actuator, an electromagnetic actuator or a ball and ramp actuator.

17. The differential assembly of claim 15, wherein the actuation mechanism is a pneumatic actuator, a hydraulic actuator or an electromagnetic actuator.

18. The differential assembly of claim 15, wherein in said first position said shaft is disconnected from said second differential output shaft; and wherein in said second position said shaft is drivingly connected to said second differential output shaft.

19. The differential assembly of claim 15, further comprising a bearing, wherein said bearing is disposed between said first clutch actuation mechanism and said first reduced diameter portion of said first end portion of said differential case.

20. The differential assembly of claim 15, further comprising a first thrust bearing, wherein said first thrust bearing is disposed between said first clutch actuation mechanism and said one or more thrust pins in said one or more openings of said first radially extending wall of said differential case.

21. The differential assembly of claim 20, further comprising a first radially extending thrust wall and a second thrust bearing;
 wherein said first radially extending thrust wall is integrally connected to and extends radially outboard from an outer surface of said first reduced diameter portion of said first end portion of said differential case; and
 wherein said second thrust bearing is disposed between said first clutch actuation mechanism and said first radially extending thrust wall of said first reduced diameter portion of said first end portion of said differential case.

22. A differential assembly, comprising:
 a differential case having a first end portion, a large diameter intermediate portion and a second end portion;
  wherein said large diameter intermediate portion has a first end portion, second end portion, a first end, second end, an inner surface and an outer surface defining a hollow portion therein;
  wherein a first reduced diameter portion of said first end portion of said differential case is disposed adjacent to and axially outboard from said first end of said large diameter intermediate portion and a first radially extending wall connects said first reduced diameter portion of said first end portion of differential case to said first end of said large diameter intermediate portion;
  wherein at least a portion of one or more thrust pins extend through one or more openings extending from an inner surface to an outer surface of said first radially extending wall into said hollow portion of said large diameter intermediate portion;
  wherein a first reduced diameter portion of said second end portion of said differential case is disposed adjacent to and axially outboard from said second end of said large diameter intermediate portion and a second radially extending wall connects said first reduced diameter portion of said second end portion of differential case to said second end of said large diameter intermediate portion;
  wherein at least a portion of one or more thrust pins extend through one or more openings extending from an inner surface to an outer surface of said second radially extending wall;
 a first differential side gear, a second differential side gear and one or more differential pinion gears disposed within said hollow portion of said large diameter intermediate portion of said differential case;
  wherein said first differential side gear is drivingly connected to a first differential output shaft having a first end portion and a second end portion;
  wherein said second differential side gear is drivingly connected to a first end portion of a stub shaft and a second end portion of said stub shaft is rotatively connected to at least a portion of a first end portion of a second differential output shaft;
 a clutching assembly having a first portion and a second portion disposed within said hollow portion of said large diameter intermediate portion of said differential case;
  wherein said first portion of said clutching assembly comprises a plurality of clutch teeth circumferentially extending from an axially outboard side of said second differential side gear;
  wherein said second portion of said clutching assembly is drivingly connected to and slidingly engaged with said first end portion of said second differential output shaft and a plurality of clutch teeth circumferentially extend from an axially inboard side of said second portion of said clutching assembly;
 a clutch can in driving engagement with said second end portion of said first differential output shaft and disposed within said hollow portion of said large diameter intermediate portion of said differential case;
 a clutch pack comprising a first and a second plurality of clutch plates;
  wherein said first plurality of clutch plates are drivingly engaged with said inner surface of said first end portion of said large diameter intermediate portion and said second plurality of clutch plates are drivingly engaged with an outer surface of said clutch can;
 a first clutch actuation mechanism disposed radially outboard from said first reduced diameter portion of said first end portion of said differential case;
  wherein said first clutch actuation mechanism drives said one or more thrust pins in said one or more openings of said first radially extending wall in an axial manner to apply a force to said clutch pack causing said first and said second plurality of clutch plates to be at least variably frictionally engaged;
 a second clutch actuation mechanism disposed radially outboard from said first reduced diameter portion of said second end portion of said differential case; and
  wherein said second clutch actuation mechanism drives said one or more thrust pins in said one or more openings of said second radially extending wall in an axial manner to apply a force to said second portion of said clutching assembly to selectively meshingly engage said plurality of clutch teeth on said second portion of said clutching assembly with said plurality of clutch teeth on said axially outboard side of said second differential side gear.

* * * * *

UNITED STATES PATENT AND TRADEMARK OFFICE
CERTIFICATE OF CORRECTION

PATENT NO. : 10,197,144 B2
APPLICATION NO. : 15/411555
DATED : February 5, 2019
INVENTOR(S) : Kenneth E. Cooper Page 1 of 1

It is certified that error appears in the above-identified patent and that said Letters Patent is hereby corrected as shown below:

In the Claims

Claim 1: replace the word "top" at Column 38, Line 4 with the word "to".

Signed and Sealed this
Second Day of April, 2019

Andrei Iancu
*Director of the United States Patent and Trademark Office*